United States Patent [19]
Hogg et al.

[11] Patent Number: 5,463,624
[45] Date of Patent: Oct. 31, 1995

[54] BUS ARBITRATION METHOD FOR TELECOMMUNICATIONS SWITCHING

[75] Inventors: Raymond L. Hogg, Carrollton; Felix V. Diaz, Plano, both of Tex.

[73] Assignee: DSC Communications Corporation, Plano, Tex.

[21] Appl. No.: 228,513

[22] Filed: Apr. 15, 1994

[51] Int. Cl.$^6$ .................................................. H04L 12/403
[52] U.S. Cl. ...................................... 370/85.6; 340/825.5
[58] Field of Search ........................... 370/60, 60.1, 58.1, 370/58.2, 58.3, 94.1, 94.2, 85.1, 85.6, 85.2, 67; 340/825.5, 825.51

[56] References Cited

U.S. PATENT DOCUMENTS

| | | | |
|---|---|---|---|
| 5,140,584 | 8/1992 | Suzuki | 370/85.6 |
| 5,150,358 | 9/1992 | Punj et al. | 370/85.6 |
| 5,157,654 | 10/1992 | Cisneros | 370/60 |

Primary Examiner—Wellington Chin
Attorney, Agent, or Firm—Baker & Botts

[57] ABSTRACT

A bus arbitration method for telecommunications switching is provided that receives a plurality of requests of a plurality of priorities for an available asynchronous bus time slot, wherein each request has a weighted age. The plurality of requests are ordered according to the weighted age of each request and access to the bus time slot is granted to a request having the highest weighted age. Further, a bus arbitration method for telecommunications switching is provided that generates a plurality of requests of a plurality of priorities for each of a plurality of packets needing an available bus time slot. An amount of time during which each request is pending is measured. The plurality of requests for the available asynchronous bus time slot are sent to a centralized asynchronous slot arbiter operable to grant access to one of the plurality of packets corresponding to a request having a highest weighted age. The packet for which access is granted may then be placed in the available ingress asynchronous bus time slot by the interface module receiving the grant.

21 Claims, 15 Drawing Sheets

252 → B10 – START OF GRANT MESSAGE INDICATOR (SET TO 0)
254 → B9:B7 – REQUEST PRIORITY LEVEL GRANTED (PRIORITY LEVELS 0:3,4=URGENT)
256 → B6:B5 – SELECTED CHASSIS IDENTIFICATION (0:3)
258 → B4:B1 – SELECTED PHYSICAL CHASSIS SLOT IDENTIFICATION (0:15)
260 → B0 – ODD PARITY CHECK BIT FOR GRANT MESSAGE BITS B10:B1

BUS ARBITRATION METHOD FOR TELECOMMUNICATIONS SWITCHING

TECHNICAL FIELD OF THE INVENTION

This invention relates in general to the field of telecommunications, and more particularly to a bus arbitration method for telecommunications switching.

BACKGROUND OF THE INVENTION

In communication systems in which multiple sources of information share the same communications channel, a method for regulating access to the common channel that is fair (however fairness is defined) to all the sources of information is always needed. The method of regulating sequential access to the common medium amongst all the sources of information is known as the arbitration method.

One typical communication system is made of multiple communication modules, each equipped with a transmitter and a receiver, interconnected by a common bus to which all the modules have access for transmission and reception. Communication between the modules takes place when one of the modules accesses the bus for a predetermined period of time and uses that time to transmit a finite amount of information to one of more receiving modules. Typically only one transmitter can have access to the shared medium at any given time. When more than one module wishes to transmit into the medium at the same time, which is a typical occurrence in packet mode communications, a conflict arises. The bus arbitration mechanism resolves the conflict created by the simultaneous requests to use the shared bus.

Based on the physical location of the arbitration, packet oriented communications buses have used one of two arbitration methods: centralized, or distributed. In a centralized arbitration method, a specialized piece of equipment, called an arbiter, sits in a central part of the bus collecting requests from all the communicating modules and resolving contentions created by simultaneous access requests from multiple modules. In a distributed arbitration method on the other hand, there is no arbiter per se; instead the communicating modules resolve their contention problems in a democratic manner by exchanging some form of arbitration information amongst themselves. One example of a distributed arbitration method is a token passing algorithm, implemented either in a bus or in a ring.

Distributed arbitration algorithms have been and continue being successfully implemented in many commercial packet communications systems, but they exhibit a number of deficiencies. One deficiency is that their performance tends to degrade with speed and distance. This is due to the finite amount of time that it takes for the distributed contention to be resolved, for instance, the amount of time that it takes for the token to change hands, or the time that it takes for certain signal levels to settle. This latency results in a less than 100% maximum utilization of the shared bus bandwidth. In other words, bandwidth is wasted while the modules decide who should access the bus next. Another deficiency of the distributed arbitration method is that in many instances the fairness of the arbitration method degrades as the distance between communication modules or the speed of the shared bus increases. A centralized arbitration method on the other hand may be conceived that is perfectly fair regardless of speed of distance.

Arbitration mechanisms in the past were devised for packet communications, which for the most part are not time-sensitive forms of communication. In these older arbitration methods, contentions between simultaneous requests for bus access are resolved in a first-come/first-serve basis, or in a round-robin fashion, or in any other fashion that is considered fair and equitable to all the communicating modules. Even when the arbitration method supports multiple priorities, these priorities are normally not associated with a time-constrained class of requests. In other words, requests are not tied to the time they were issued, and therefore there is no concept of the increasing urgency of a given request as time elapses without the request being granted. For these reasons, the majority of the packet communication arbitration methods developed in the past are not suitable to the support of real-time-demanding forms of communication such as voice or video communications. This is a widely known fact; successful commercial products such as CSMA/CD buses or token passing rings perform poorly if used to carry voice or video traffic.

A widely used solution to enhance the real-time traffic carrying capabilities of a communication bus is to divide its available capacity into a number of fixed size bandwidth slices, each slice occupying a fixed amount of time to transmit into the bus. The time slices are better known as time slots. This type of bus is usually referred to as a slotted bus. Each of the time slots can be used to transmit and receive a fixed amount of information (normally a small amount, such as 64 octets). This bus structure has the advantage or reducing the access latency to the bus, since in the case of multiple simultaneous requests to access the bus no single transmitter could monopolize the bus for longer than one time slot.

In a non-slotted bus on the other hand, a single transmitter could obtain access to the bus and begin transmission of a long file, for instance, without the ability to preempt the transfer if other more real-time demanding forms of communication were in need of accessing the bus. But even if a slotted bus is better suited than a non-slotted bus to support both real-time and non-real-time forms of communication concurrently, the arbitration method employed in conjunction with the slotted bus, as explained before, could still be non-optimal for the support of both real-time and non-real-real time communications.

Consequently, a new arbitration mechanism for a slotted bus must be developed that is capable of efficiently support new forms of communication, both real-time demanding and real-time tolerant. The new arbitration mechanism must take into consideration multiple priority levels defined by their access delay requirements, and must grant access to the shared bus in a fair manner according to the delay priority of the requests. This invention describes a centralized arbitration method for a slotted bus. The arbitration method supports multiple priority levels of both real-time and non-real time communication forms.

SUMMARY OF THE INVENTION

Therefore, a need has arisen for a bus arbitration method for telecommunications switching that allows the arbitration mechanism to be tuned to match the changing needs of a plurality of asynchronous communications services. In accordance with the present invention, a bus arbitration method for telecommunications switching is provided that substantially eliminates or reduces disadvantages and problems associated with prior bus arbiters.

According to one embodiment of the present invention, a bus arbitration method for telecommunications switching is provided whereby a centralized bus arbiter entity receives a plurality of requests for an idle bus time slot, wherein each request is aged with a weighting factor associated with its priority level. The plurality of requests are ordered according to the weighted age of each request and access to an idle bus time slot is granted to a request having the highest weighted age.

According to another embodiment of the present invention, a bus arbitration method for telecommunications switching is provided wherein an interface module generates a plurality of requests to a centralized arbiter entity, one for each switching delay priority level supported, for each of a plurality of packets needing access to an idle bus time slot. The amount of cumulative time during which each request has been pending is continuously measured by the centralized bus arbiter entity. The plurality of requests for an idle bus time slot are processed by a centralized bus arbiter and a decision is made to grant access to one of the plurality of requests having the highest weighted age. The packet associated with an individual request for which access is granted is in turn placed on the available bus time slot by the associated interface module.

A technical advantage of the present invention is the minimization of the number of time slots on a system bus that are not used when requests for such time slots are pending.

Another technical advantage of the present invention is the ability to dynamically change the weighting of different classes of service to allow the arbitration mechanism to be tuned to match varying network characteristics.

A further technical advantage of the present invention is a dynamically controllable system that allows a certain percentage of available bus time slots to be deterministically guaranteed to a certain class of user during a timeframe that the demand for bus time slots exceeds the availability thereof. The arbitration mechanism can be modified to allow an individual requestor or class of such requestors the full bandwidth of the bus or to limit such a requestor to any fraction of the total bandwidth of the bus during the periods of time when the instantaneous demand for bandwidth exceeds the availability thereof.

A further technical advantage of the present invention is an expedite arbitration mechanism that is operable by the centralized bus arbiter in parallel with the normal weighted age based arbitration. This arbitration mechanism supersedes the normal weighted age arbitration mechanism and guarantees the absolute minimum low latency access to ingress asynchronous bus bandwidth for extremely urgent communications needed for management/control functions.

An addition technical advantage of the present invention is the ability to dynamically control or limit the amount of bus bandwidth that can be consumed via the expedite arbitration mechanism over time.

BRIEF DESCRIPTION OF THE DRAWINGS

A more complete understanding of the present invention may be acquired by referring to the following description taken in conjunction with the accompanying drawings in which like reference numbers indicate like features and wherein.

DETAILED DESCRIPTION OF THE INVENTION

A centralized bus arbitration method according to the teachings of the present invention determines which of a plurality of requests are granted and in what order taking into consideration the time of arrival as well as the switching/delay priority of each request. Requests of the same priority level are handled in strictly first-in/first-out order with respect to one another. However, delay sensitive requests are granted with a higher priority than low delay sensitivity requests. This is done without completely blocking low priority services. The effect of arbitration is to regulate switching delay parameters of connections according to their class of service ensuring in this way a guaranteed quality of service regardless of the traffic mix.

The fairness of the arbitration method of the present invention relies on a most deserving request doctrine coupling the concept of servicing waiting time and priority into a weighted age of a request. The weighted age of a bus request is a function of the elapsed time after the initial bus request arrival and the priority level of the request. For each priority level, at least one weighting factor is defined. The weighted age of a request is the product of its associated weighting factor multiplied by the elapsed waiting time of the request.

A technical advantage of the bus arbitration method of the present invention is a reduction in switching delay variations of high priority real-time-demanding classes of service in the presence of demand for bandwidth from a mixture of service types. Thus, the bus arbitration method of the present invention supports multiple classes of service with strict real-time requirements better than other arbitration methods.

Block Diagram of Multi-Service Switch

Figure 1:
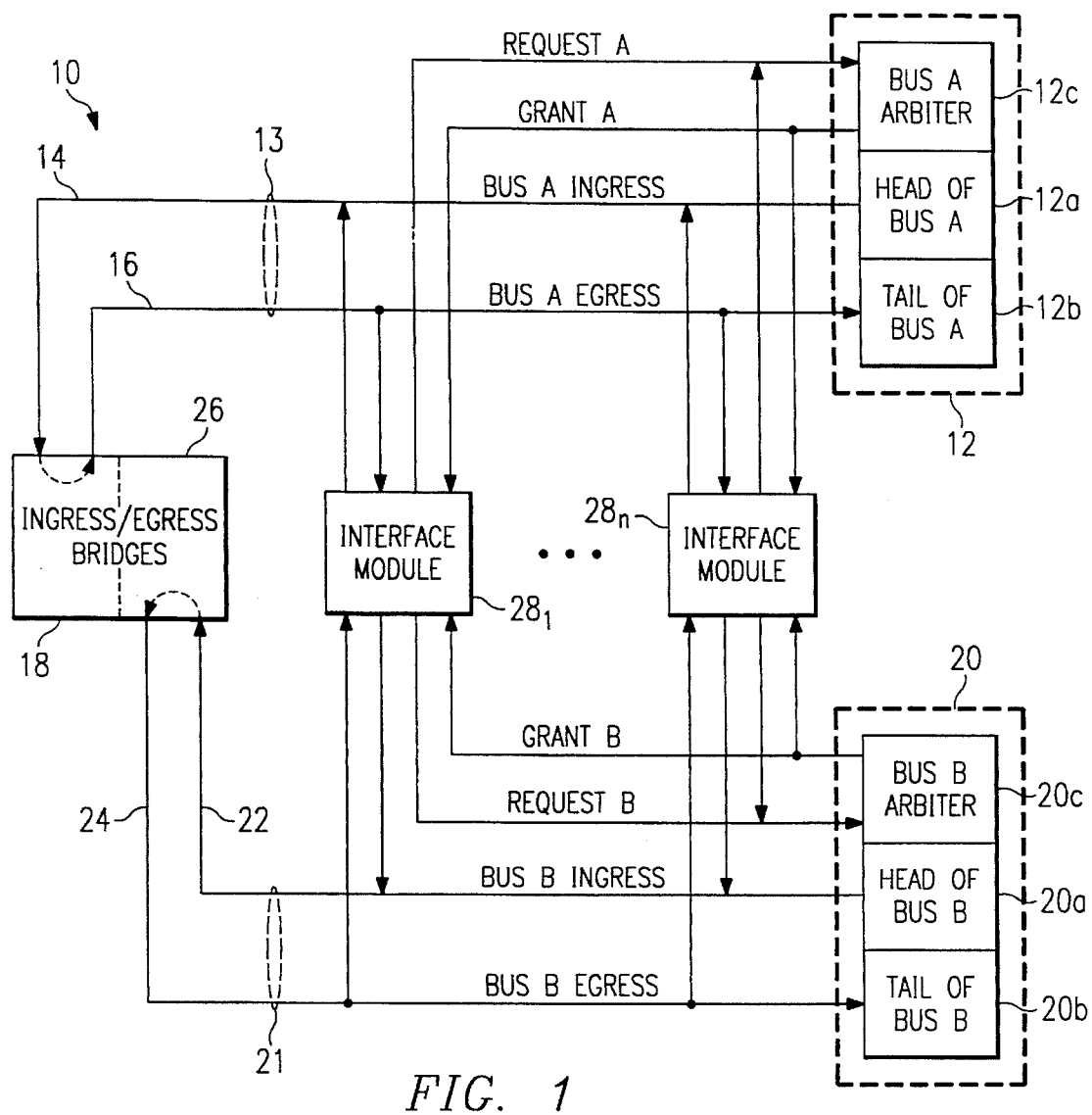
FIG. 1 illustrates a block diagram of a multi-service switch for a telecommunications network utilizing the centralized bus arbitration method and apparatus of the present invention.

FIG. 1 illustrates a block diagram of a multi-service switch for a telecommunications network indicated generally at 10. Multi-service switch 10 is described in more detail in U.S. patent application Ser. No. 08/228,304 entitled "A Multi-Service Switch for a Telecommunications Network" assigned to the assignee of the present application, the disclosure of which is hereby incorporated herein by reference. A head-of-bus control 12A has an output, and a tail-of-bus control 12B has an input. A slotted bus 13 has an ingress portion 14 and an egress portion 16. Ingress portion 14 is coupled to the output of head-of-bus control 12A, and egress portion 16 is coupled to the input of tail-of-bus control 12B. An ingress/egress Bus A bridge 18 has an input and an output. The input of ingress/egress Bus A bridge 18 is coupled to ingress portion 14 of slotted bus 13, and the output of ingress/egress Bus A bridge 18 is coupled to egress portion 16 of slotted bus 13.

A second head-of-bus control 20A has an output and a second tail-of-bus 20B has an output. A second slotted bus 21 has an ingress portion 22 and an egress portion 24. Ingress portion 22 is coupled to the output of head-of-bus control 20A, and egress portion 24 is coupled to the input of tail-of-bus control 20B. A second ingress/egress Bus B bridge 26 has an input and an output. The input of ingress/egress Bus B bridge 26 is coupled to ingress portion 22 of slotted bus 21, and the output of ingress/egress Bus B bridge 26 is coupled to egress portion 24 of slotted bus 21.

A number of interface modules $28_1$ through $28_n$ are connected to slotted bus 13 and slotted bus 21 as shown. Each interface module $28_1$ through $28_n$ has a first input coupled to egress portion 16 of first slotted bus 13, a first output coupled to ingress portion 14 of first slotted bus 13, a second input coupled to egress portion 24 of second slotted bus 21, and a second output coupled to ingress portion 22 of second slotted bus 21.

In operation, multi-service switch 10 operates to support communication between interface modules $28_1$ through $28_n$ via slotted bus 13 and slotted bus 21. Head-of-bus control 12A and head-of-bus control 20A operate to generate the timing and control necessary to configure time slots on slotted bus 13 and slotted bus 21 to allow communication over a number of bus overlays associated with different telecommunications data formats. Ingress/egress Bus A bridge 18 and ingress/egress Bus B bridge 26 operate to connect ingress portion 14 and egress portion 16 of slotted bus 13 and to connect ingress portion 22 and egress portion 24 of slotted bus 21.

Overview of the Slotted Buses

Multi-service switch 10 consists of a pair of slotted buses 13 and 21. In one embodiment, each slotted bus operates at a nominal speed of 800 megabits per second (Mbps), for a combined speed of 1.6 gigabits per second (Gbps). In this embodiment, slotted bus 13 and slotted bus 21 are both identically formatted into two hundred time slots of sixty-four octets each and framed at a repetitive rate of 8 KHz.

Slotted bus 13 and slotted bus 21 are formed from unidirectional ingress portions 14 and 22 and unidirectional egress portions 16 and 24 extending the entire length of the connected interface modules $28_1$ through $28_n$ with the ingress portions 14 and 22 and the egress portions 16 and 24 connected together by ingress/egress bus bridges 18 and 26. Physically, multi-service switch 10 is contained in a chassis or a cluster. A chassis is a number of interface modules coupled with head-of-bus/tail-of-bus controls and ingress/egress bus bridges. A cluster is a collection of one to four chassis all sharing the same slotted buses. Head-of-bus control 12A and head-of-bus control 20A create the timing and control for ingress portions 14 and 22. Ingress/egress bus bridges 18 and 26 generate the timing and control for egress portions 16 and 24 connecting the ingress portions to the egress portions retiming each signal with derived egress portion timing. Every interface module $28_1$ through $28_n$ residing in a chassis or a cluster interfaces to both slotted bus 13 and slotted bus 21 using ingress portions 14 and 22 to source incoming traffic into the system of multi-service switch 10 and using egress portions 16 and 24 to sink outgoing traffic from the system of multi-service switch 10.

Slotted bus 13 and slotted bus 21 are hybrid in nature. The bus time slots are individually allocated to support one of two major types of telecommunications service categories, isochronous services or asynchronous services. Isochronous services are telecommunications services that require predictable and periodic access to the slotted buses. All circuit services—narrowband, wideband, and broadband—are included in this category and are supported via two isochronous bandwidth overlays using a portion of reserved bandwidth of the slotted buses 13 and 21. Asynchronous services are those that support bursty telecommunications information. All packet services including asynchronous transfer mode (ATM) services are supported by an asynchronous overlay using the remainder of the slotted bus bandwidth not reserved for isochronous services.

Bus Overlays

Figure 2A:
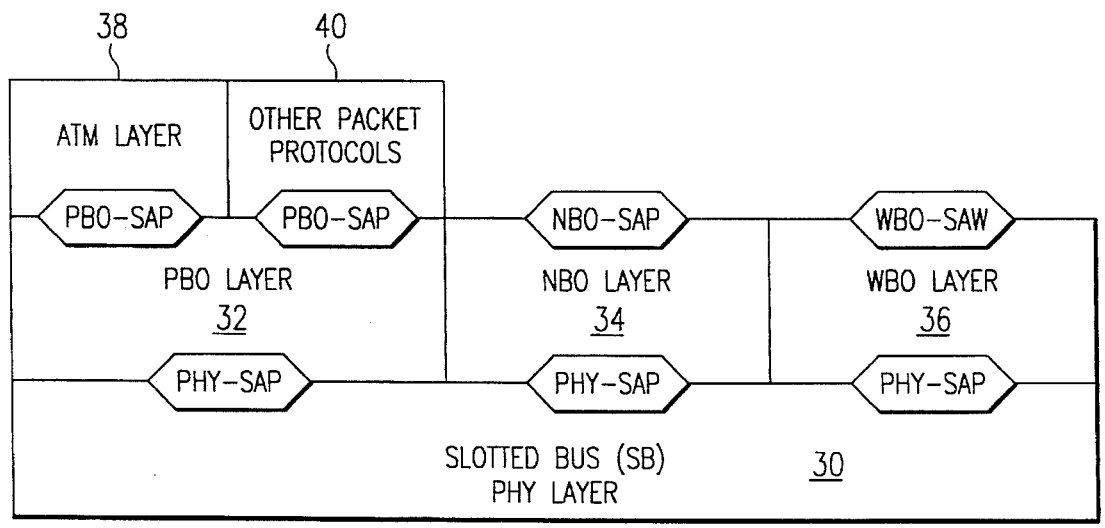
FIG. 2a illustrates bus overlays including a packet bus overlay layer.

FIG. 2a illustrates a protocol stack of three bus overlays on a physical slotted bus. A slotted bus (SB) physical (PHY) layer 30 models the physical slotted buses of the multi-service switch. The SB PHY layer implements the actual transfer of data, both asynchronous and isochronous, to and from the time slots of the slotted buses. A packet bus overlay (PBO) layer 32, a narrowband bus overlay (NBO) layer 34, and a wideband bus overlay (WBO) layer 36 model three unique access protocols for using the physical transport services provided by the slotted bus physical layer 30 of the multi-service switch. The asynchronous transfer mode (ATM) layer 38 and other packet protocols 40 model the protocol layers for providing asynchronous transfer mode communications and other packet-based data communication protocols that use the PBO layer for switching.

Packet bus overlay layer 32 models the packet bus overlay access protocol of the multi-service switch and implements the set of services used by the asynchronous transfer mode layer 38 or by other packet protocols 40 supported by the multi-service switch. The PBO layer 32 allows the exchange of fixed-length packets across the slotted buses of the multi-service switch as a connectionless datagram service. Packet bus overlay layer 32 is optimized to provide efficient transport services for 53 octet cells (e.g. ATM cells and 802.6 cells) amongst multiple interface modules residing throughout a multi-service switch chassis or cluster. The packet bus overlay 32 is used to implement all asynchronous packet-based including cell-based and frame-based services provided by the multi-service switch 10. In addition to the packet bus overlay layer 32, the slotted bus physical layer 30 supports narrowband bus overlay 34 and wideband bus overlay 36.

The slotted bus physical layer 30 is configurable to maintain a plurality of bus overlays. Each bus overlay is associated with one of a plurality of unique data formats supporting a plurality of telecommunications services. As shown in FIG. 2a, slotted bus physical layer 30 supports packet bus overlay layer 32 for asynchronous communication services, narrowband bus overlay layer 34 for narrowband isochronous communication services and wideband bus overlay layer 36 for wideband and broadband isochronous communication services. This creates three virtual buses operating independently on one physical bus.

Allocation of Time Slots Between Three Bus Overlays

Figure 2B:
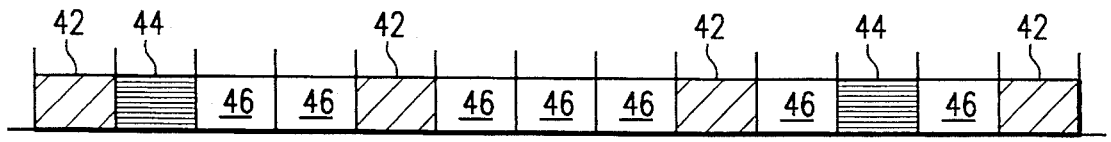
FIG. 2b illustrates allocation of time slots.

FIG. 2b illustrates allocation of bus time slots between three bus overlays. FIG. 2b illustrates a number of bus time slots where the time slot on the left comes sooner in time than the time slots on the right. As time advances, the bus time slots move along the bus from right to left carrying data relating to telecommunications information. Time slots 42 are allocated to an isochronous wideband bus overlay. Time slots 44 are allocated to an isochronous narrowband bus overlay. Time slots 46 are allocated to an asynchronous packet bus overlay. Thus, all three overlays exist simultaneously and independently of one another by allocation to separate time slots. A multi-service switch for a telecommunications network is operable to allocate dynamically the plurality of time slots on the slotted bus between bus overlays without a disruption of data transmission. For example, time slots allocated to isochronous data and asynchronous data according to a particular mapping can be re-allocated to a different mapping without disrupting transmission of the remaining traffic.

Packet Bus Overlay

Figure 3A:
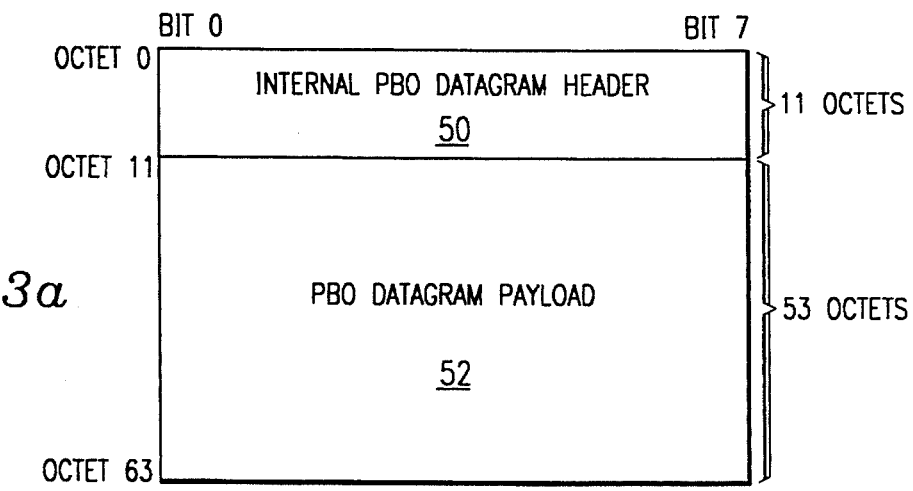
FIG. 3a illustrates a packet bus overlay datagram format.

FIG. 3a illustrates an asynchronous packet bus overlay datagram format. The datagram format includes an internal packet bus overlay (PBO) datagram header 50 and a packet bus overlay (PBO) datagram payload 52. The datagram format includes sixty-four octets where each octet is eight bits of data as shown. Internal packet bus overlay datagram header 50 consumes the first eleven octets, octet 0 through octet 10. Packet bus overlay datagram payload 52 consumes the last fifty-three octets, octet 11 through octet 63.

The packet bus overlay operates to provide a connectionless datagram transfer service between packet bus overlay addressable entities through a multi-service switch. A packet bus overlay datagram describes a sixty-four octet packet composed of eleven octets of reserved overhead, along with a fifty-three octet datagram payload optimized to carry an asynchronous transfer mode cell, as illustrated in FIG. 3a. Addressing and routing control information is included in datagram header 50 to allow the packet bus overlay datagram service to be extended throughout a single-chassis, single-cluster, or multi-cluster switching system. A multi-cluster switching system consists of multiple multi-service switch clusters interconnected via an expansion mechanism. Further, a multi-cluster switching system consists of multiple clusters interconnected via a self-routing switching fabric. Such a self-routing switching fabric is disclosed in U.S. patent application Ser. No. 08/228,598, entitled "Buffered Crosspoint for Asynchronous Transfer Mode Switch and Method of Operation" assigned to the assignee of the present application, the disclosure of which is incorporated herein by reference.

Figure 3B:
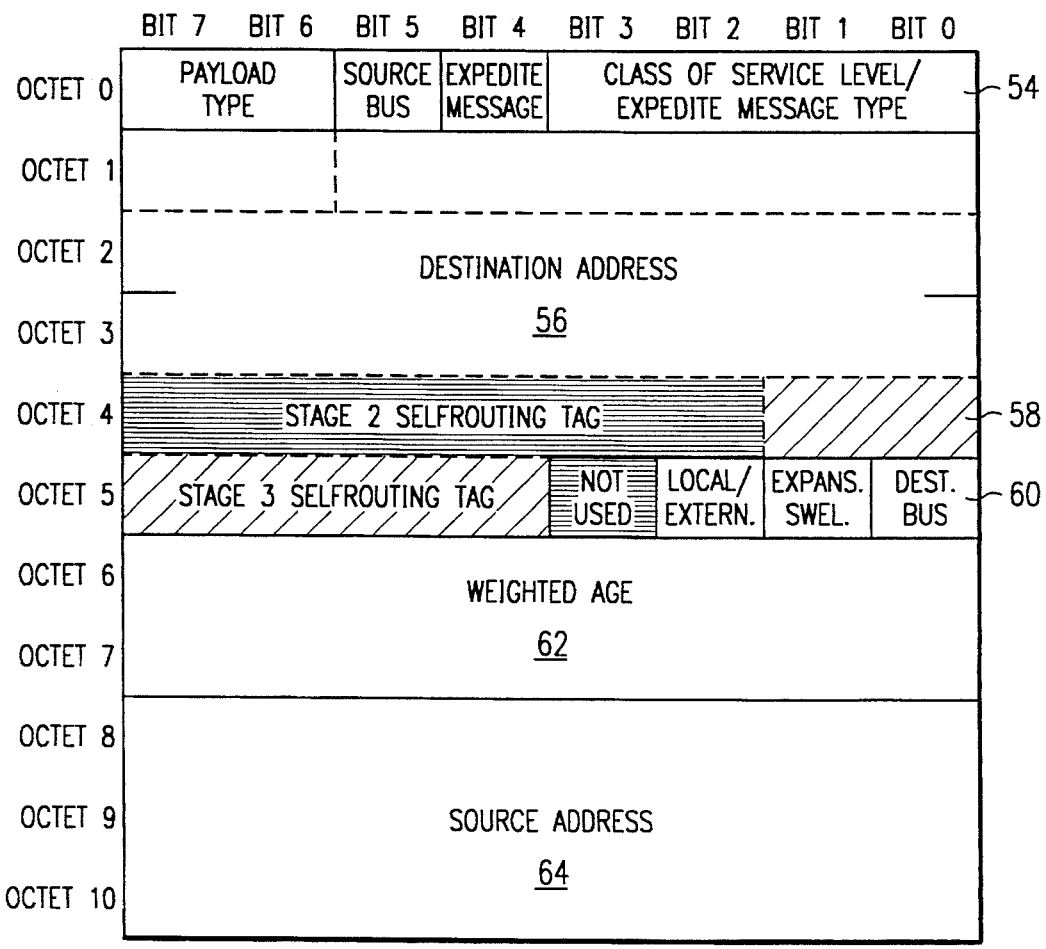
FIG. 3b illustrates a packet bus overlay datagram header format.

FIG. 3b illustrates a packet bus overlay datagram header format. The packet bus overlay datagram header format includes 11 octets, octet 0 through octet 10, each comprising 8 bits as shown. A first octet 54 includes the payload type, source bus, expedite message and class of service level/expedite message type information. The next three octets hold the destination address 56 for the datagram. A fifth octet 58 holds a stage 2 self-routing tag and the first two bits of a stage 3 self-routing tag. A sixth octet 60 holds the last 4 bits of the stage 3 self-routing tag, and indications as to whether routing is to a local or external destination, a selection of which expansion switching element and destination bus to utilize. The seventh and eighth octets hold a weighted age 62 (i.e., the cumulative age of a datagram within the system weighted by a factor), and the ninth through eleventh octets hold the source address 64 of the associated datagram.

The packet bus overlay datagram header contains all of the internal overhead information required to support full connectionless bearer service of datagrams throughout a multi-service switch system. The header includes routing information for both point to point and point to multi-point delivery service, quality of service descriptors, cumulative weighted age, and payload type descriptors. FIG. 3b illustrates these various fields and their location in the packet bus overlay datagram header.

Quality of Service Classes

The packet bus overlay supports a number of different quality of service (QoS) classes, also referred to as classes of service (CoS). In one embodiment of a multi-service switch system constructed according to the teachings of the present invention, two attributes define a particular class of service. These attributes are the switching delay priority and the packet loss probability. Different combinations of values of those two attributes create multiple CoS levels. The overhead assigned to each datagram of the present invention can support multiple class of service levels. Four levels are discussed herein for illustrative purposes only. The packet bus overlay layer ensures a distinct service separation between the supported classes of service. This means that the packet bus overlay layer ensures that the two measurable goals of switching delay and packet loss probability are maintained for each of the four classes of service of this embodiment. This separation of classes is independent of the mix of traffic of different classes of service passing through the packet bus overlay. To accomplish service separation, the packet bus overlay layer discriminates amongst datagrams based on each datagram's associated class of service and acts accordingly. This discrimination requires some arbitration of the asynchronous requests for time slots on the slotted bus.

The packet bus overlay of the present invention supports an additional class of service referred to as an expedite class of service which is not subjected to the same normal arbitration as the other classes of service and which is not measured in terms of its switching delay or packet loss characteristics. The expedite class of service is used for intersystem management communications of an urgent nature, such as a failure or congestion notifications. Expedite class of service datagrams are handled in a strict first come first serve order amongst themselves in this embodiment of the present invention. Expedite class of service datagrams do not compete directly with datagrams of the other four normal classes of service for access to the buses.

Bearer Services

The packet bus overlay layer provides entities with packet bus overlay bearer services consisting of both point to point (unicast) and point to multi-point (multicast) modes of data transfer. A unicast datagram is a datagram that contains a datagram header containing an individual destination address associated with a single peer packet bus overlay entity. Conversely, a multi-cast datagram is a datagram that contains a header containing a group destination address associated with one or more peer packet bus overlay entities.

Multi-cast packet bus overlay datagram service is identical to unicast datagram service with the exception that each multi-cast datagram, obtained from a single source, is potentially copied from a slot of the asynchronous bus by multiple destination peer packet bus overlay entities, all of which are associated with the common group address.

Figure 4:
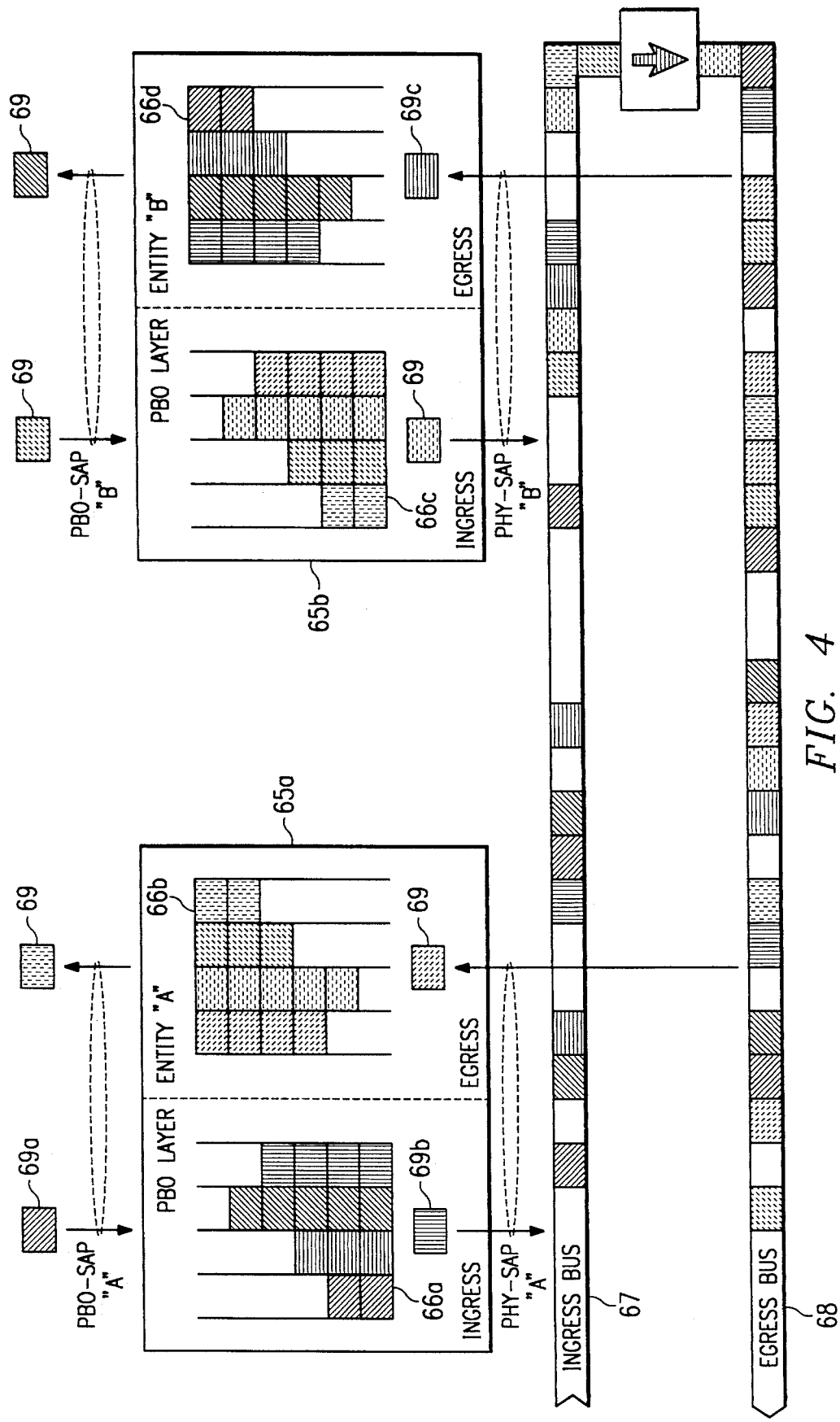
FIG. 4 illustrates communication between two individual packet bus overlay entities.

FIG. 4 illustrates a block diagram of entity to entity unicast communication. A first packet bus overlay layer entity 65a and a second packet bus overlay layer entity 65b communicate via an ingress bus 67 and an egress bus 68. Packet bus overlay layer entity 65a and packet bus overlay layer 65b communicate via datagrams 69.

The packet bus overlay unicast communication occurs between two peer packet bus overlay layer entities 65a and 65b within a multi-service switch system of the present invention. Unicast datagrams 69 are utilized for point to point transport of data having a number of different class of service levels between the two communicating peer entities 65a and 65b. As shown in the embodiment of FIG. 4, there are four different class of service levels as indicated by the four queues in each of the ingress and egress queuing systems 65b in packet bus overlay layer entity 65a and packet bus overlay layer entity 65b. Datagrams 69a that originate after a request from a user of the packet bus overlay layer entity 65a are placed in the ingress queuing system 66a of packet bus overlay layer entity 65a while awaiting access to the underlying physical bus layer. Unicast datagrams 69b wait for granted access to an asynchronous time slot on ingress bus 67 for transmission throughout the multi-service switch system. The class of service level associated with datagrams 69b determines the priority that the packet bus overlay layer entity 65a requests from the arbiter and is granted for access to ingress bus 67.

The destination address of every datagram broadcasted via the asynchronous time slots on the egress bus 68 is examined one by one by peer packet bus overlay layer entities 65a and 65b. When destination peer packet bus overlay layer entity 65b recognizes a destination address matching one of its assigned individual addresses, packet bus overlay layer entity 65b creates a copy of the datagram 69c and places it in the egress queuing system 66d of packet bus overlay layer entity 65b according to the associated class of service level. The datagram 69c then awaits delivery to the upper layer entity. Unicast datagrams 69 are maintained in separate subqueues in all encountered queuing systems 66a–d according to their class of service levels in order to provide the separation of quality of service levels associated with each class of service. Asynchronous time slots are used both for local switching of packet services utilizing packet bus overlay datagrams between entities of the same slotted bus, entities in the same chassis or cluster, and for external switching between entities in different clusters.

Datagram Time Stamping and Aging

A multi-service switch constructed according to the teachings of the present invention supports multiple communications services with different quality of service requirements for switching delay and packet loss. Switching delay is more critical to some packet services than to others. Fast switching times are more important for example to video connections than to bulk data connections; thus video connections should be switched more expeditiously than bulk data connections. Data of time constrained communications services should be preferred over less time constrained communications services even when the latter have spent less time in the system. A priority scheme capable of discriminating between the time-related needs of the various communications services greatly reduces the switching delays and delay variations of time-sensitive communications services such as video and voice communications.

In a multi-service switch system of the present invention, the switching delay component of the quality of service is maintained by the packet bus overlay layer using a datagram timestamping procedure. The timestamping procedure utilizes the weighted age field of the datagram header illustrated in FIG. 6b. The timestamping process records the time of arrival of each datagram into a packet bus overlay layer queuing system. The datagrams are timestamped when they come into the system. In one embodiment of the present invention, the time stamp is a two's complement number stored locally associated with the datagram, calculated as the difference between the value of a time of arrival counter and the value in the weighted age field of the datagram header. At the time of departure of the datagram from the queue, the difference between the stored timestamp and the datagram's time of departure is calculated. The difference between these two values is the actual time spent by the datagram in the queue plus the age of the datagram when it arrived to the queue, in other words, the updated datagram's age.

In order to discriminate between multiple classes of service with different switching delay quality of service requirements, the aging process is weighted. The ages of datagrams of different classes increase at different rates, representing the varying urgency of their switching. A configurable parameter is associated with every class of service level and is used as a weighting factor to weight the age values calculated for datagrams of each class of service level. This feature is described in more detail in U.S. patent application Ser. No. 08/228,598 entitled "Buffered Crosspoint Matrix for an Asynchronous Transfer Mode Switch and Method of Operation" which has been previously incorporated herein by reference. Generally, the age of a datagram is multiplied by the weighting factor to produce the weighted age of the datagram. This weighted age value is then used to allow priorities and cumulative delay to be considered in the service discipline as a single figure of merit. When multiple datagrams of different switching delay priority compete for the same output, the one with the largest age value is selected next.

The operation of the weighted age algorithm is as follows: each class of service is equipped with a time counter that increments by one weight factor (WF) each switching interval. The WF value of each class is different and programmable. High priority delay classes of service are programmed with a higher WF value than low priority classes. The time counters of each class do not have to be synchronized. Assume that at the time of arrival of a datagram to a queue, the time counter associated with the datagram CoS contains the value $T_\emptyset$, and that the datagram's weighted age is $Age_\emptyset$. The timestamp is calculated as $TS=T_\emptyset-Age_\emptyset$. The value of TS is stored with the datagram. Assume that at the time of departure of the datagram, the time counter value is $T_1$, where $T_1>T_\emptyset$. The new age of the datagram is calculated as $T_1-TS=T_1-(T_\emptyset-Age_\emptyset)=(T_1-T_\emptyset)+Age_\emptyset$. Since $T_1-T_\emptyset$ is the weighted time spent by the datagram in this queue, the value obtained by this calculation is the new weighted age of the datagram, made of the previous weighted age, plus the weighted time spent in this queue.

Thus, the cumulative weighted age of a datagram equals the cumulative time spent in all the queues up to the present time multiplied by the associated weighting factor. This value is placed in the header of the datagram and carried between queues of the multi-service switch system of the present invention. The weighted age is represented as an integer number of bus time slot intervals. It is a system-wide variable, thus its value increases cumulatively when a datagram passes from one queue to the next queue in the switching system. The weighted age of a datagram is therefore updated and carried between queuing systems in the weighted age field of the datagram header.

Asynchronous Time Slot Arbitration

The bursty nature of asynchronous packet traffic requires that on demand ingress access to the asynchronous time slots be regulated to ensure that all interface modules using packet traffic obtain a fair amount of the asynchronous bus bandwidth considering urgency and quality of service of requests. To accomplish orderly on demand ingress access for asynchronous interface modules to the slotted bus, all asynchronous interface modules generate a bus transfer request for each asynchronous packet that needs to be switched from ingress to egress side of the slotted bus. Different priority levels of requests are issued depending upon the class of service of the packet waiting to be transferred. A centralized asynchronous slot arbiter entity collocated with the head-of-bus control on each system bus collects these requests from the interface modules within the cluster (i.e., attached to the slotted bus) and grants access to free asynchronous time slots to interface modules requesting asynchronous bus bandwidth. Arbitration is a systemwide contention resolution process implemented by the central asynchronous slot arbiter. Asynchronous slot arbitration is a fully duplicated function as there is one independent centralized asynchronous slot arbiter per slotted bus collocated with its associated head-of-bus control.

The purpose of the asynchronous slot arbiter is to select and grant ingress access to an idle asynchronous time slot from a plurality of up to N pending requests received from a plurality of interface modules connected to the slotted bus. The selection and access grant results in the dynamic assignment of the next idle asynchronous time slot to the winning requestor communicated to the winner via a specific grant message encoded on a serial grant bus monitored by all requesting interface modules. The arbitration process repeats once every switching interval equal to one time slot cycle. No selection or access grant is necessary during a switching interval just prior to an isochronous time slot because isochronous slots are not accessible to asynchronous traffic. However, all pending requests are aged during such switching intervals. Arbitration prevents asynchronous bandwidth abuse by individual interface modules and resolves multiple simultaneous requests for the use of asynchronous time slots of bandwidth.

A technical advantage of the present invention is the ease of implementation in hardware and the ability to allow one hundred percent utilization of the bus bandwidth by any single user in the presence of no competition. The arbitration method of the present invention is robust and resilient to errors and grants access requests in a weighted first come/first served manner. The arbitration method of the present invention supports multiple priorities including real time demanding priorities and reduces head of line blocking where a low priority request prevents later high priority arrivals from accessing the bus. Finally, the arbitration method of the present invention minimizes priority inversions where a packet is granted access to the bus even though the same or higher priority packets have arrived before it.

Selection Mechanism

The asynchronous slot arbiter simultaneously processes up to N requests, where N is equal to M multiplied by the maximum number of interface modules capable of interfacing to the slotted bus, and M is equal to the maximum number of request priority levels supported by each interface module. Of the M possible requests from each interface module, M–1 are subjected to the weighted age arbitration mechanism and are classified as normal requests according to the teachings of the present invention. One of the requests from each interface module is an expedite request that is subjected to special low latency arbitration rather than the weighted age arbitration performed for normal requests according to the teachings of the present invention. The asynchronous slot arbiter processes both types of requests in parallel and grants requests to the asynchronous time slots on the bus according to a predefined discipline. Expedite requests are in general always granted first, and in the case of multiple or simultaneous expedite requests, a strict order of arrival amongst the expedite requests is observed and requests are granted accordingly. The weighted ages of all pending normal requests are continuously being updated while all pending expedite requests are being processed so that all request waiting times are accounted for. After all pending expedite requests are granted, normal requests are arbitrated according to the weighted ages and requests are granted accordingly.

Expedite Requests

Each interface module is capable of issuing one expedite request at a time. An interface module issues an expedite request when the interface module has urgent data that needs to be transferred across the slotted bus with extremely low latency. Only a small fraction of the total bus traffic normally uses the expedited access capability. A limit to the number of expedite requests granted per unit of time can easily be imposed by the asynchronous slot arbiter so that the number of expedite requests does not exceed a pre-defined amount of bandwidth and possibly interfere with normal packet traffic. The asynchronous slot arbiter immediately grants preferred access to any expedite requests as discussed above unless the predefined limit is reached. This limit can be a dynamically programmable parameter of the arbitration mechanism according to the teachings of the present invention.

A centralized asynchronous slot arbiter operating according to the teachings of the present invention examines all pending expedite requests during each bus cycle and assigns the next available asynchronous time slot to one of the requests in first-come/first-served order as long as the threshold for the maximum number of expedite requests per unit of time has not been exceeded. Expedite requests are granted at the first available asynchronous time slot with no waiting time other than that imposed by the passing of isochronous time slots. Generally, expedite requests preempt all other normal requests with normal requests never being promoted over an expedite request. The only exception is when the threshold for the maximum number of expedite requests granted per unit of time has been exceeded. When this threshold has been reached, the normal requests are processed as if no expedite requests were currently pending.

Normal Requests

Every asynchronous interface module capable of accessing the slotted bus can potentially issue up to M–1 normal requests as discussed above. These normal requests may be shared amongst one or more classes of service that have common delay sensitivity requirements. For example, a system may support four classes of service and yet only support a maximum of three request priority levels so M equals three. The first normal request level could be shared by high sensitivity to delay services and assigned to a first and a second class of service distinguished only by their degree of loss sensitivity. Likewise, the second normal request level could be shared by low sensitivity to delay services and assigned a third and a fourth class of service. Each interface module working with the asynchronous slot arbiter would issue a high priority request for a time slot transfer of packets of the first or second class of service, and would issue a low priority request for a time slot transfer of packets of the third or fourth class of service.

Arbitration Tournament

The weighted ages of normal requests from all the interface modules in the cluster are collected by the asynchronous slot arbiter for a global contention resolution tournament to determine which request will receive access to the next available time slot. During one tournament, the asynchronous slot arbiter selects one of the pending requests amongst all the pending normal requests during one switching interval and grants access to the next available asynchronous time slot to the selected request. The total number of pending normal requests can equal up to $(n \times (m-1))$ where n is the number of supported interface modules and m is the number of supported request priority levels.

According to the teachings of the present invention, the asynchronous slot arbiter selects the request (or one of multiple requests) holding the highest weighted age. The selection of this request takes into account the need to preserve first-come/first-served discipline while allowing higher priority requests to advance in the order in which the requests are served.

The normal contention resolution tournament (i.e., ignoring expedite requests) basically consists of two primary tasks. The first primary task consists of monitoring a plurality of possible requests from a plurality of interface modules and maintaining a cumulative age value for each of these possible requests to indicate the amount of time each individual request has been pending. The second primary task consists of sorting through all of the cumulative age values for all pending requests and selecting the request with the highest age value (i.e., in general the request that has been waiting the longest) and granting this selected request ingress access to the next asynchronous time slot. In the case that multiple requests are found to have the same highest age values, a request is simply selected at random from this group (i.e., all requests of the same age are equally deserving regardless of their priority). In one embodiment of the present invention, the cumulative age of a request is the time elapsed since its arrival multiplied by a weight factor associated with the priority level of the request. Thus the speed of the request aging process depends upon the priority of the request and this age value is referred to as a weighted age. As a result of this weighting, higher priority requests age faster than lower priority requests.

Following the conclusion of the tournament, the highest weighted age request is selected and a grant for the next available asynchronous time slot is issued to the selected request. The associated weighted age value for the selected request is initialized to zero. The new contention resolution tournament repeats again during the next time slot interval with the remaining pending requests plus new arrivals, all competing again for ingress access to an asynchronous time slot. The pending requests enter the new tournament with a larger age value because they are now older having waited one time slot. Because weighted aging takes place at a different pace depending upon the priority of the request, the ranking of a request in this tournament during subsequent intervals may be different. For instance, a request may surpass another request if the first request is of higher priority than the second request. Thus, the first request may be served sooner than the second request even though the second request arrived first.

According to the teaching of the present invention, the weighting factor of a particular type of request is capable of being dynamically altered in response to changes in the mix of traffic being switched. Thus, the arbitration method can be adaptively tuned so the quality of service experienced by asynchronous connections is not affected by the time of day or other factors affecting traffic volume or composition of traffic. The weighting factors for the various request priority levels supported by the system are passed to the asynchronous slot arbiter as system parameters that can be changed dynamically. As an added level of customization, the weighting factor of individual requests can be made alterable. Thus, the level of deservedness of an entire request priority level, or even individual requestors, can be dynamically changed to reflect new traffic conditions according to the teachings of the present invention. In this way, the operation of the network can be adaptively tuned to the changing characteristics of the traffic on the network.

Implementation of Requests and Grants

Each interface module providing asynchronous services effectively has a request line for each supported normal request priority level. These normal requests are connected to an asynchronous slot arbiter where they are subjected to weighted age arbitration. In addition, forms of traffic requiring urgent delivery are not subjected to waiting time under the normal weighted age arbitration method as described above and utilize a special expedite request. Access to the bus for expedited traffic is requested effectively via an expedite request line. Thus, effectively one additional request line per interface module is dedicated for an expedite request.

Figure 5A:
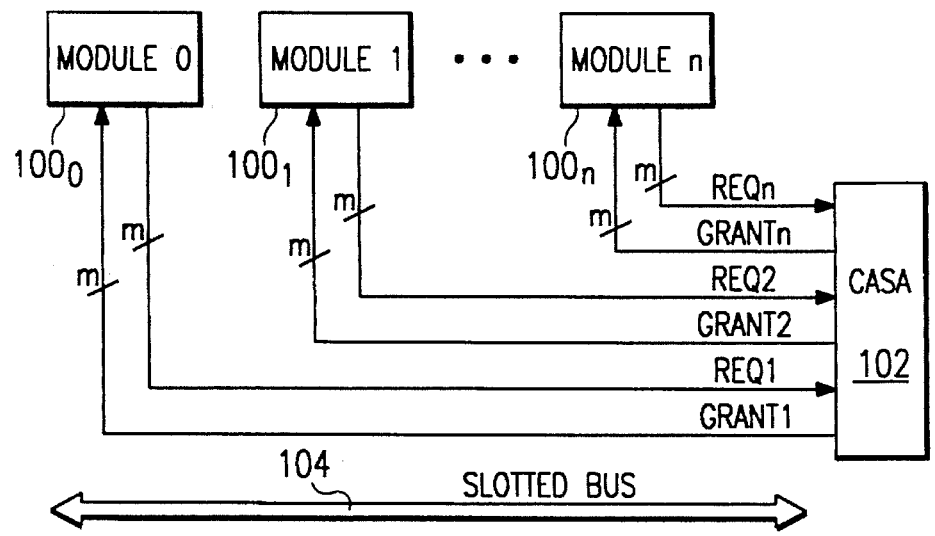
FIGS. 5a–d illustrate block diagrams of a centralized slot arbiter and format schemes utilizing the bus arbitration method of the present invention.

FIG. 5a illustrates a block diagram of a centralized asynchronous slot arbiter utilizing the bus arbitration method of the present invention. The block diagram of FIG. 5a is one embodiment provided for the purpose of illustrating the interconnection of the request and grant signals between the centralized asynchronous slot arbiter and its supported interface modules. A centralized asynchronous slot arbiter (CASA) 102 is shown coupled to each interface module $100_0$ through $100_n$ via M grant lines and M request lines as shown wherein M is the number of request priority levels supported. Interface modules $100_0$ through $100_n$ communicate one to another by access to a slotted bus 104. Although a single request line and a single grant line are shown for each interface module $100_0$ through $100_n$ multiple request lines are implemented to support a number of priority levels. The number of request lines M for each interface module $100_0$ through $100_n$ is equal to the number of normal request priority levels plus one for the expedite request. The number of grant lines is equal to the number of request lines. The request and grant lines may also be multiplexed to economize in the number of physical lines needed.

In operation, interface modules $100_0$ through $100_n$ initiate requests on the request lines. Arbiter 102 gathers the requests and holds a tournament as described above. Arbiter 102 communicates grants to interface modules $100_0$ through $100_n$ using the grant lines.

Figure 5B:
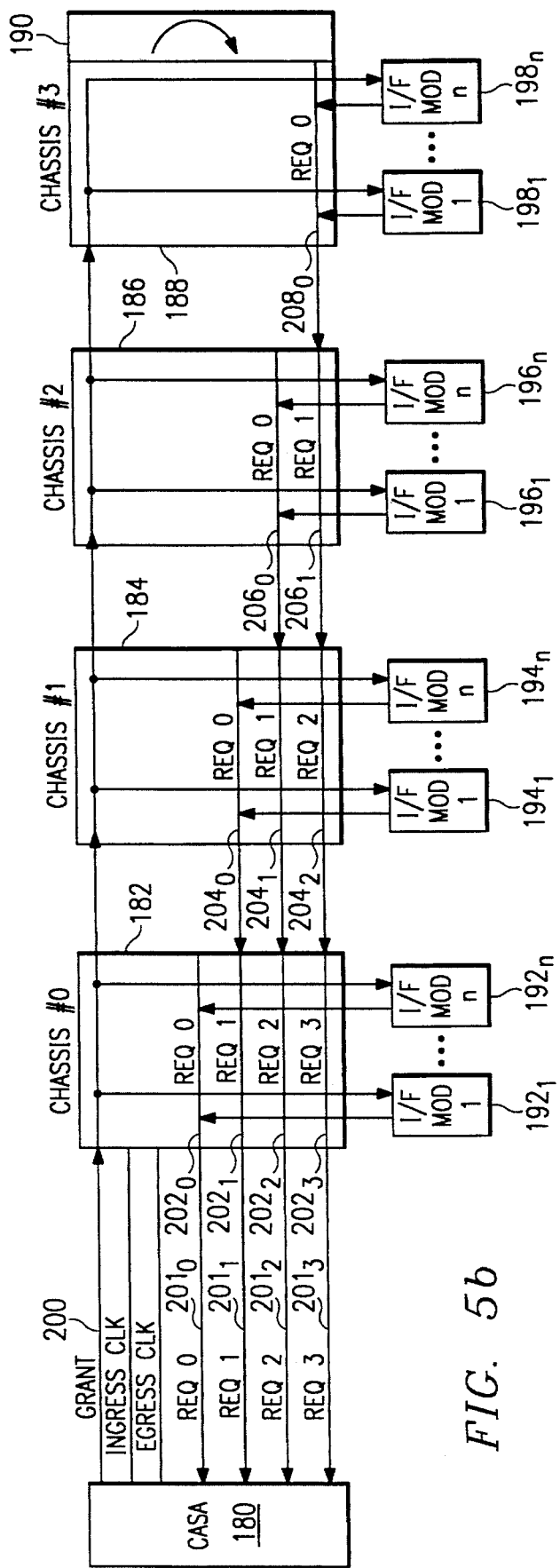

FIG. 5b illustrates a request/grant interconnection scheme employing a multiplexing of both request and grant signals from individual interface modules installed in a cluster of up to four separate physical chassis but connected to a common slotted bus. The grants for all interface modules 192 through 198 in the all four chassis 182 through 188 comprising the cluster are shown multiplexed from the centralized asynchronous slot arbiter 180 using a single serial bus distributed using the ingress timing of the cluster. In addition to the economy of issuing grants to all modules in the cluster via a single signal, coupling the serial timing of the multiplexed grant bus with the ingress timing of the cluster insures the timing relationship needed with the grant signal delivered to each interface module with respect to its local ingress timing. Using the same distribution method as the ingress slotted bus timing and control effectively eliminates the issues of compensating for timing skews between different physical slot positions and between different physical chassis. The request signals from the interface modules to the arbiter are shown multiplexed on a common request bus per physical chassis using a time division multiplexed (TDM) scheme. The individual interface modules in each physical chassis ($192_1$ through $192_n$ for chassis 182, $194_1$ through $194_n$ for chassis 184, $196_1$ through $196_n$ for chassis 186, and $198_1$ through $198_n$ for chassis 188) transmit their multiple priority level requests on the main TDM multiplexed request bus local to each associated chassis $202_0$, $204_0$, $206_0$, and $208_0$ during designated time slots related to the physical slot in which they are installed.

As illustrated in FIG. 5b, the main TDM multiplexed request buses local to each chassis are interconnected in a cascading fashion using the egress timing of the cluster to distribute the individual request signals back to the centralized arbiter. This cascading interconnection of the multiplexed request buses is incorporated with the standard expansion modules used to interconnect the slotted buses of the chassis together. The centralized asynchronous slot arbiter directly terminates the four individual multiplexed request buses $201_0$, $201_1$, $201_2$, and $201_3$ on the bus control module at the head of the bus in the first slot of chassis 182. The ingress/egress bus bridge module 190 is shown only to illustrate that the egress timing of the cluster is derived and generated in the last chassis of the cluster from the ingress timing local to that chassis. Just as with the multiplexed grant bus, the coupling of the distribution of the TDM multiplexed request buses using the egress cluster timing yields benefits beyond the economy of the multiplexing itself. By utilizing the egress timing and distributing the request signals to the arbiter along with the other egress slotted bus signals, the requests from all modules are effectively synchronized one to another and inequities in arbitration caused by timing skews amongst the requests relative to their physical position within the cluster is largely nullified. Note that the fixed TDM scheme leads to favoring requests coming from interface modules installed in the lower physical slot numbers over the higher ones. However, the weighted age arbitration method minimizes the unfairness associated with physical slot location due to the fact that once a request is granted its associated weighted age is initialized to zero and as such cannot dominate the accessible bandwidth due to its physical slot position within the cluster.

Figure 5C:
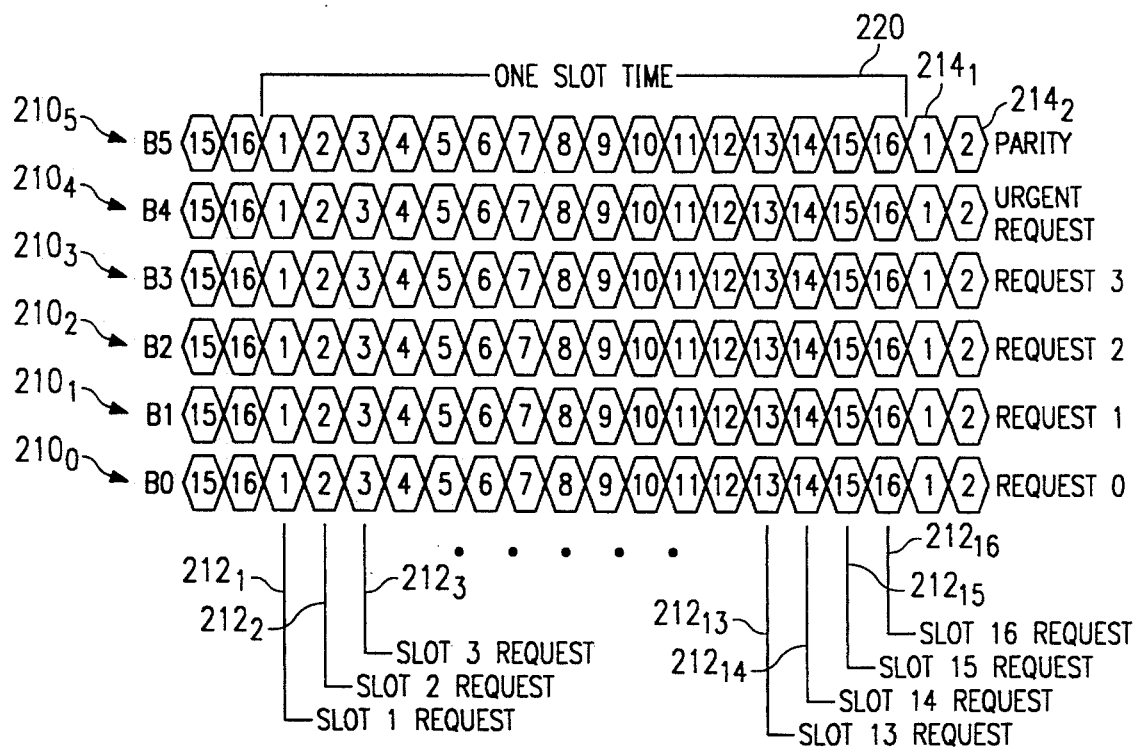

FIG. 5c illustrates the TDM multiplexed request bus format referred to above. The multiplexed request bus is six bits wide $210_0$ through $210_5$ designated B0 through B5. Each bit is associated with a unique request priority level and a sixth bit B5 is reserved to carry parity and is used to validate each individual asynchronous request. The TDM scheme is based upon the local egress time slot timing. A single request frame on this TDM multiplexed request bus consists of an egress bus time slot 220. Each interface module drives the multiplexed bus on a designated time slot related to its physical slot position within the chassis. As illustrated an interface module installed in physical slot number 1 is designated the first clock cycle of an egress time slot $212_1$. Each physical slot is designated consecutive clock cycles within an egress time slot in order $212_1$ through $212_{16}$.

Figure 5D:
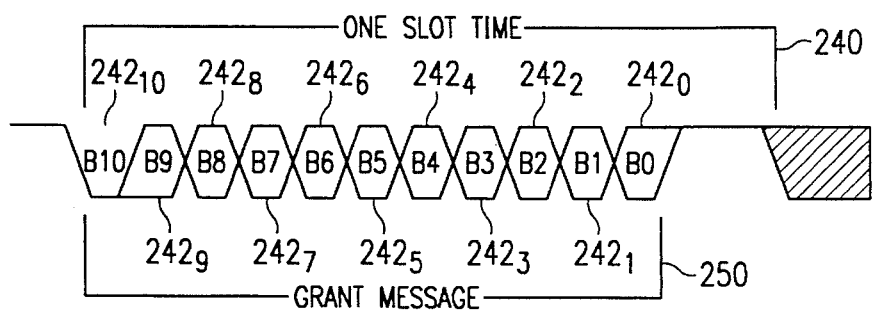

FIG. 5d illustrates the serial message format used on the grant bus line. A grant message 250 may be transmitted during the first eleven clock cycles of an ingress time slot 240. The message begins with a start indicator 252 which is always 0 to easily indicate the presence of a grant message in an ingress time slot. The next three bit field of the message 254 encodes the priority level of the associated request to which the message is granting access. Following the priority level field, a two bit field within the message 256 identifies the chassis number containing the interface module associated with the selected request being granted. The next four bit field of the message 258 identifies the physical slot number containing the interface module associated with the selected request being granted. Finally, the last bit of the message 260 carries a parity bit that covers the entire grant message for added robustness and confirmation of continuity with the arbiter by the interface modules.

Ranking of Multiple Requests

The ranking or ordering of a large number of requests according to their weighted ages is a costly endeavor if done in concurrent fashion. Consider, for instance, a method in which every request weighted age is compared to every other request weighted age to determine which value is the highest. A deficiency of this approach is that the number of comparators needed for these comparisons grows exponentially with the number of requests.

Given that the goal is to simply identify the highest value, an iterative method consisting of multiple binary comparisons is more efficient. The winners of one round of binary comparisons are again compared amongst themselves, reducing the number of survivors by half after every comparison round until after a certain number of consecutive comparisons only one survives. The winner is the weighted age having the highest value among all the weighted ages entered into the tournament. For a maximum number of N participants, the number of iterations required is k where k equals $\log_2 N$. For 256 requests, eight compare iterations are required. During the first iteration, the weighted ages are paired and compared in 128 two-input comparators. During the second iteration, the highest 128 weighted ages from the first iteration are compared using 64 two-input comparators. During the third iteration, the 64 highest weighted ages from the second iteration are compared using 32 two-input comparators and so on. After the eighth compare iteration, the highest weighted age is identified.

In addition to comparators for comparing the weighted ages, a routing network is implemented to pair the highest weighted ages after each iteration. It is desirable that the interconnecting network used be implemented with a minimum amount of hardware. One such implementation network is a shuffle exchange network.

Figure 6:
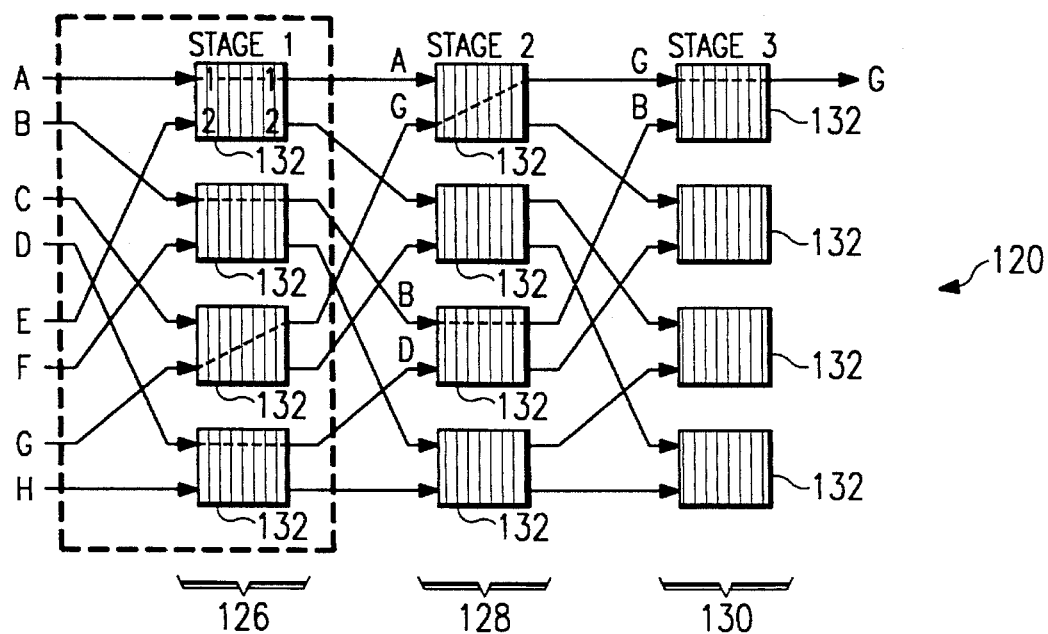
FIG. 6 illustrates a shuffle exchange interconnecting network for comparing weighted ages according to the teachings of the present invention.

FIG. 6 illustrates a shuffle exchange interconnecting network for comparing weighted ages according to the teachings of the present invention. As an example, shuffle exchange interconnecting network 120 of FIG. 6 operates on eight inputs, A through H as shown. Expanded networks for any number of inputs can be implemented. Shuffle exchange network 120 has a first stage 126, a second stage 128, and a third stage 130. These stages are comprised of blocks 132 that are interconnected as shown. Shuffle exchange network 120 of FIG. 6 has the property of being invariant in that each stage 126, 128 and 130 of shuffle exchange network 120 is topologically identical to the others. It is possible to implement shuffle exchange network 120 with only stage 126 shown inside the dotted rectangle of FIG. 6. The hardware comprising this stage can be reused after each iteration removing the necessity of implementing a large number of physical stages.

Each block 132 in FIG. 6 consists of a simple pass/cross switch and a two-input comparator. The simple pass/cross switch is activated by the results of the binary comparison performed by the two-input comparator. If the value of the weighted age of input 1 is larger than that of input 2, the result is a pass so input 1 is connected to output 1 and input 2 is connected to output 2. Conversely, if the input 2 weighted age value is larger than that of input 1, the result is a cross so input 2 is connected to output 1 and input 1 goes to output 2.

Each level of iteration uses one stage of a shuffle exchange network. In FIG. 6, first stage 126 is used during the first iteration. During this first iteration, weighted ages A–H are compared in pairs as shown. Assume that A, B, G, and D are larger than their pairs E, F, C, and H respectively. Then these four are switched to the inputs of second stage 128 as shown in FIG. 6 to be compared in the second iteration. During the second iteration in second stage 128, A is compared to G, and B is compared to D in the two darkened blocks 132 as shown. Assume that G is larger than A, and B is larger than D. At the end of the second iteration, B and G are switched to the inputs of third stage 130 as shown. During the third iteration, the highest of the two weighted ages G and B is switched to the first output of top block 132 of third stage 130. This output always contains the highest weighted age at the end of the compare procedure regardless of the number of participants and the input permutation of their weighted age values. Thus, G is the output 1 of top block 132 of the third stage 130 as the highest weighted age.

A random tie breaker scheme can easily be incorporated into the design of the simple binary input pass/cross switch whereby if the two inputs are found to be equal, the previous state of the switch element could be used to break the tie. Given the interconnection of the shuffle exchange network, this simple method should provide adequate random behavior.

Interface Module Bus Access and Control

Each interface module maintains a subqueue for each class of service supported. A first-in/first-out queueing method is implemented independently in each of the classes of service subqueue. Within each subqueue, the ordering is strict first-in/first-out. However, higher priority packets in one subqueue may get ahead of lower priority packets in another subqueue waiting for access to the bus. Each interface module determines if a packet is present at the head of each of its corresponding subqueues and issues a request of the associated priority level for each class of service subqueue needing access to the bus. If multiple CoS subqueues share a single request priority level, the module itself must choose which packet from the head of all subqueues sharing a single request priority level gains access to the bus upon a grant received from the arbiter.

Detail Arbitration Method

The following discussion outlines the detailed steps comprising the centralized arbitration method for asynchronous telecommunications switching according to the teachings of the present invention. Specifically, FIGS. 7a–b illustrate the detailed process steps required of the interface modules to service the multiplexed request bus and the serial grant bus in order to issue requests and receive grants for on demand ingress access to an idle asynchronous time slot.

Figure 7A:
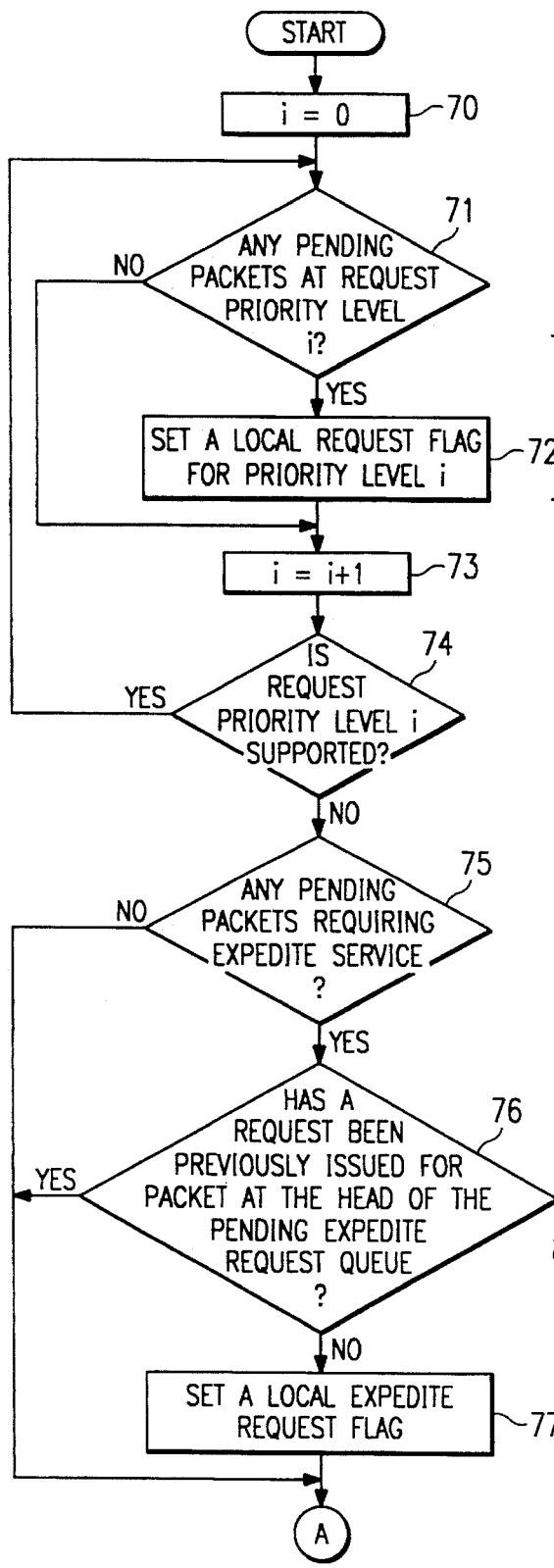
FIGS. 7a–b illustrate flow charts of a bus arbitration method according to the teachings of the present invention.
Figure 7B:
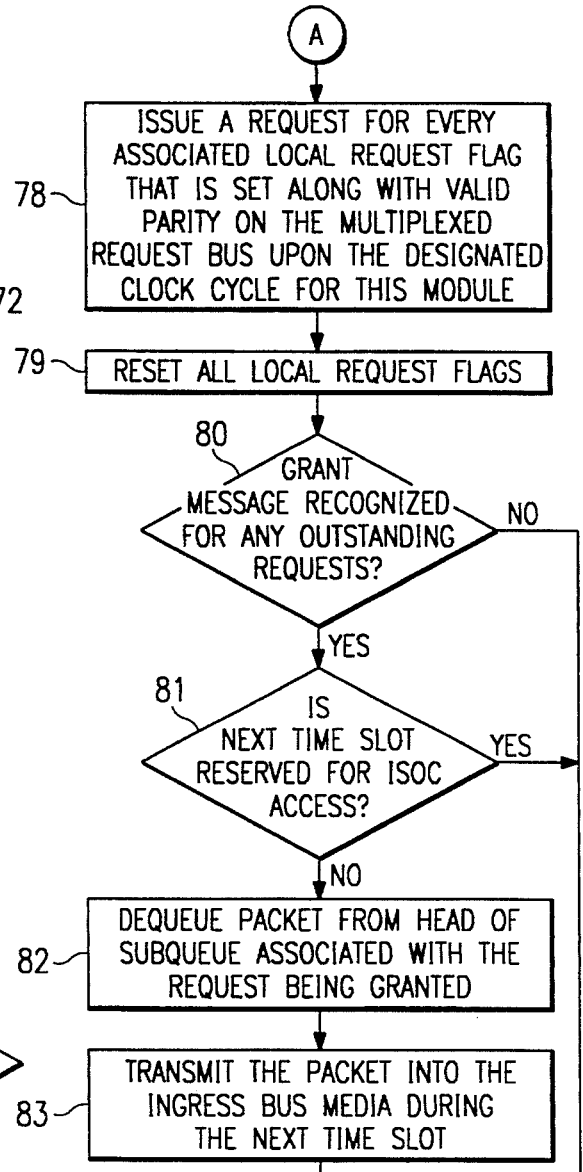
Figure 8A:
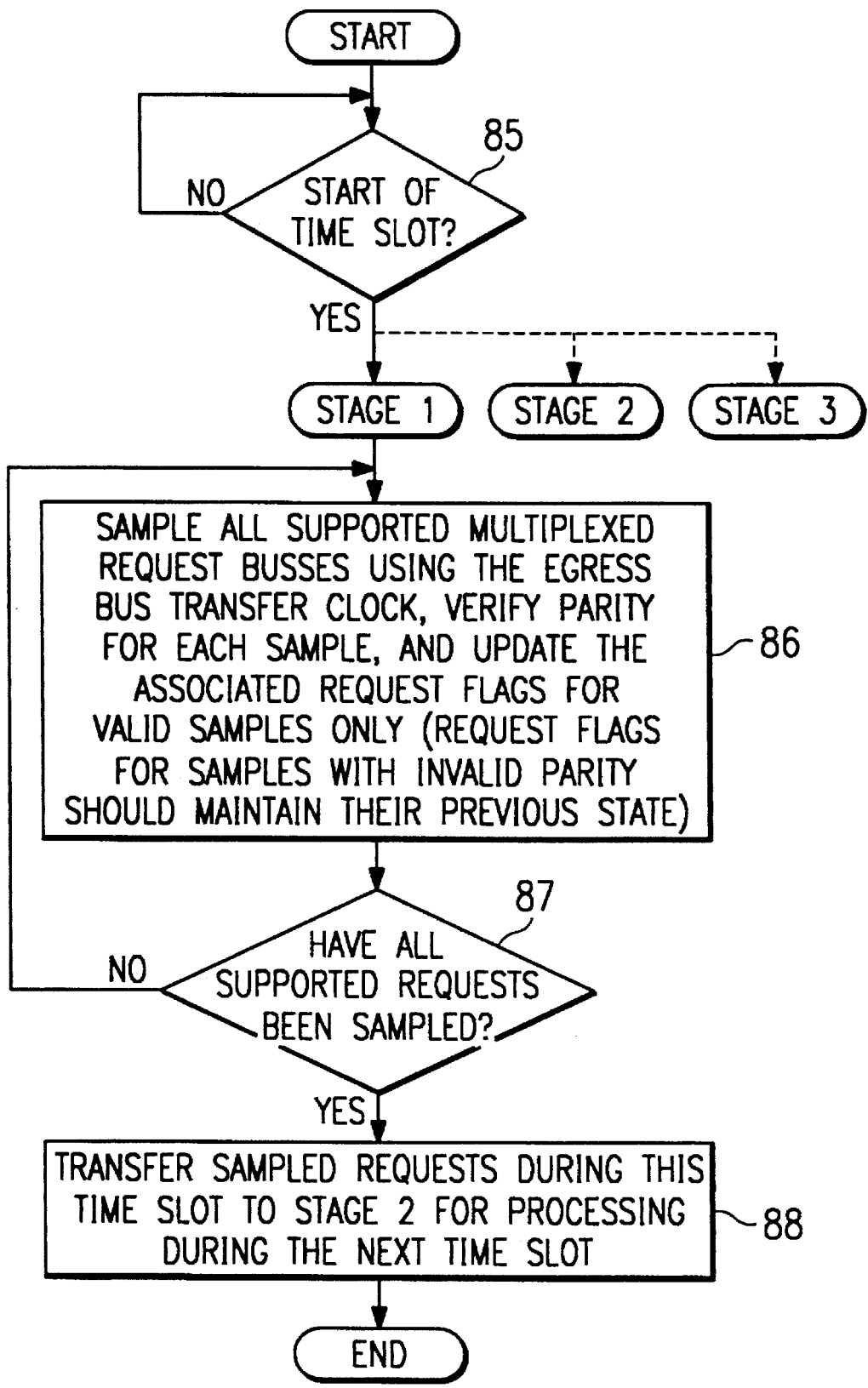
FIGS. 8a–e illustrate flow charts of a method utilized by a slot arbiter in an arbitration tournament according to the teachings of the present invention.
Figure 8B:
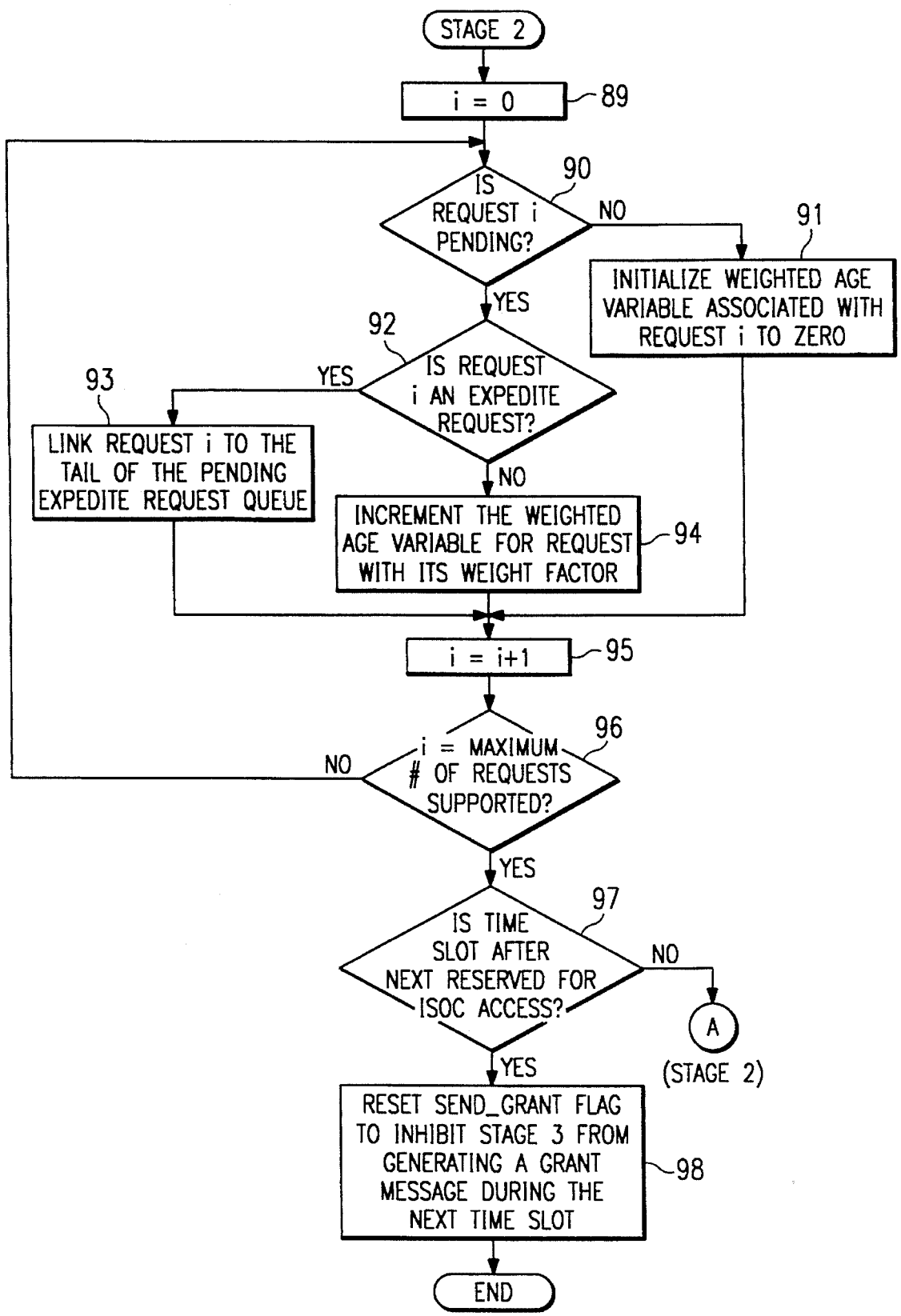
Figure 8C:
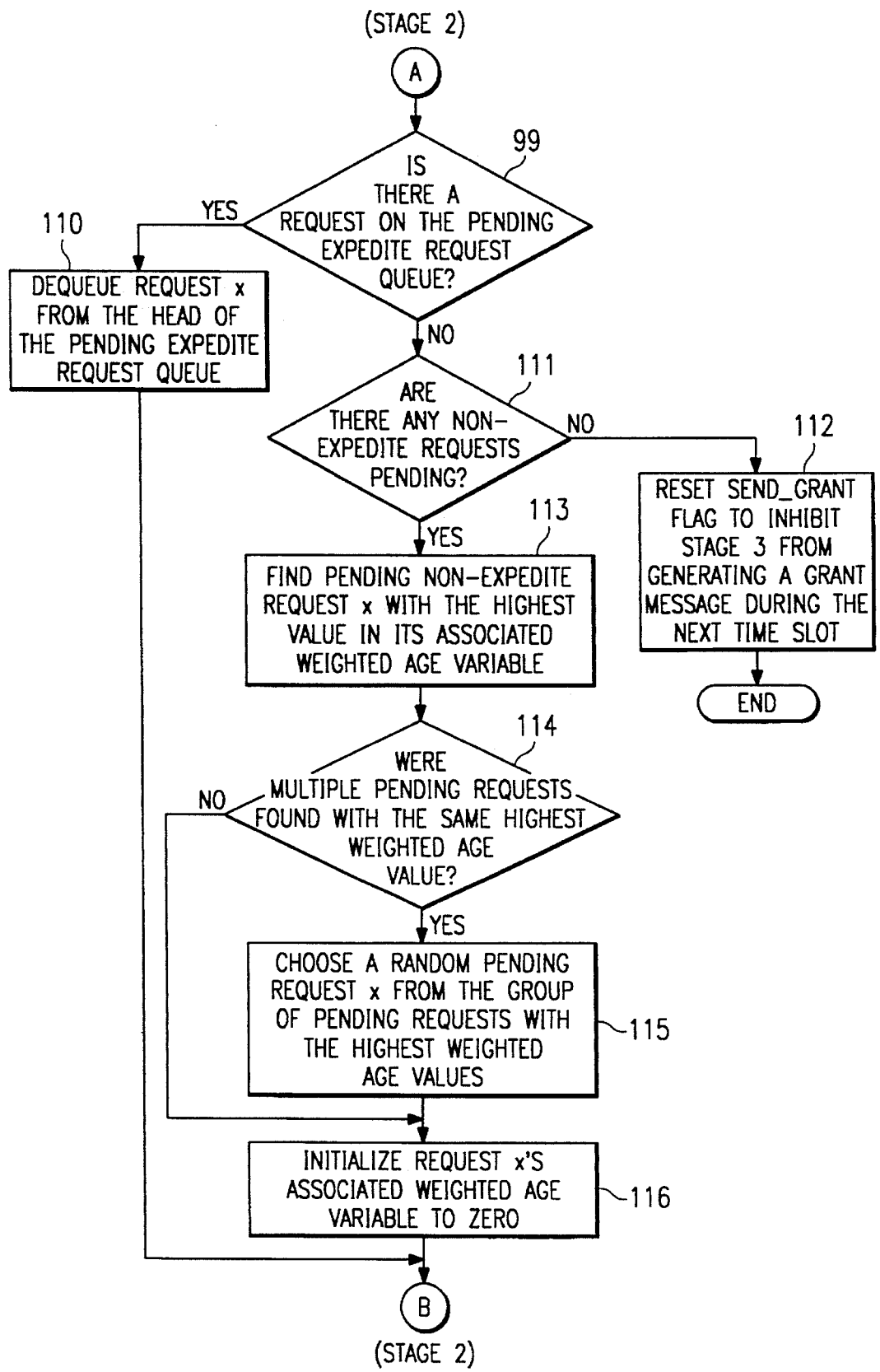
Figure 8D:
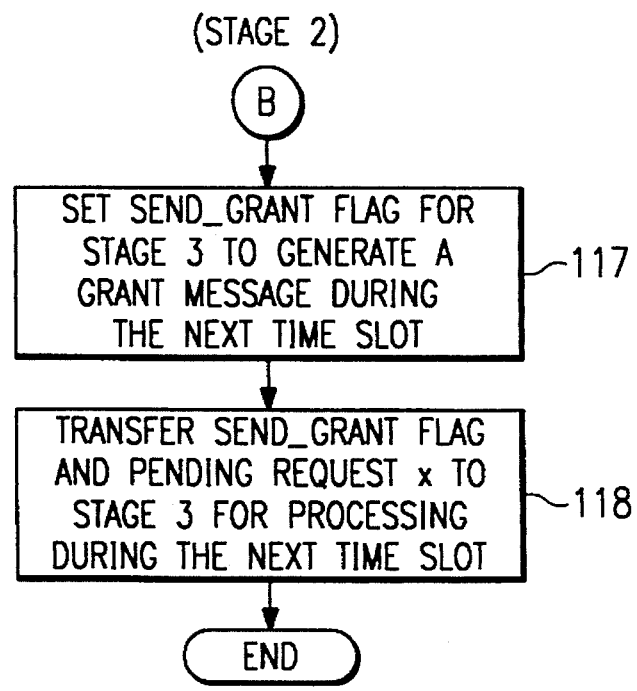
Figure 8E:
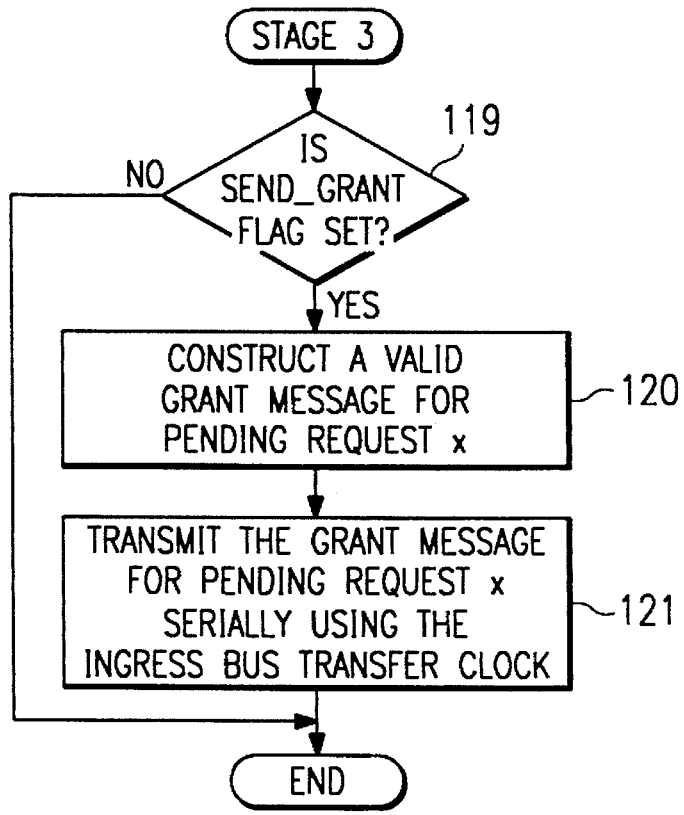
Figure 9A:
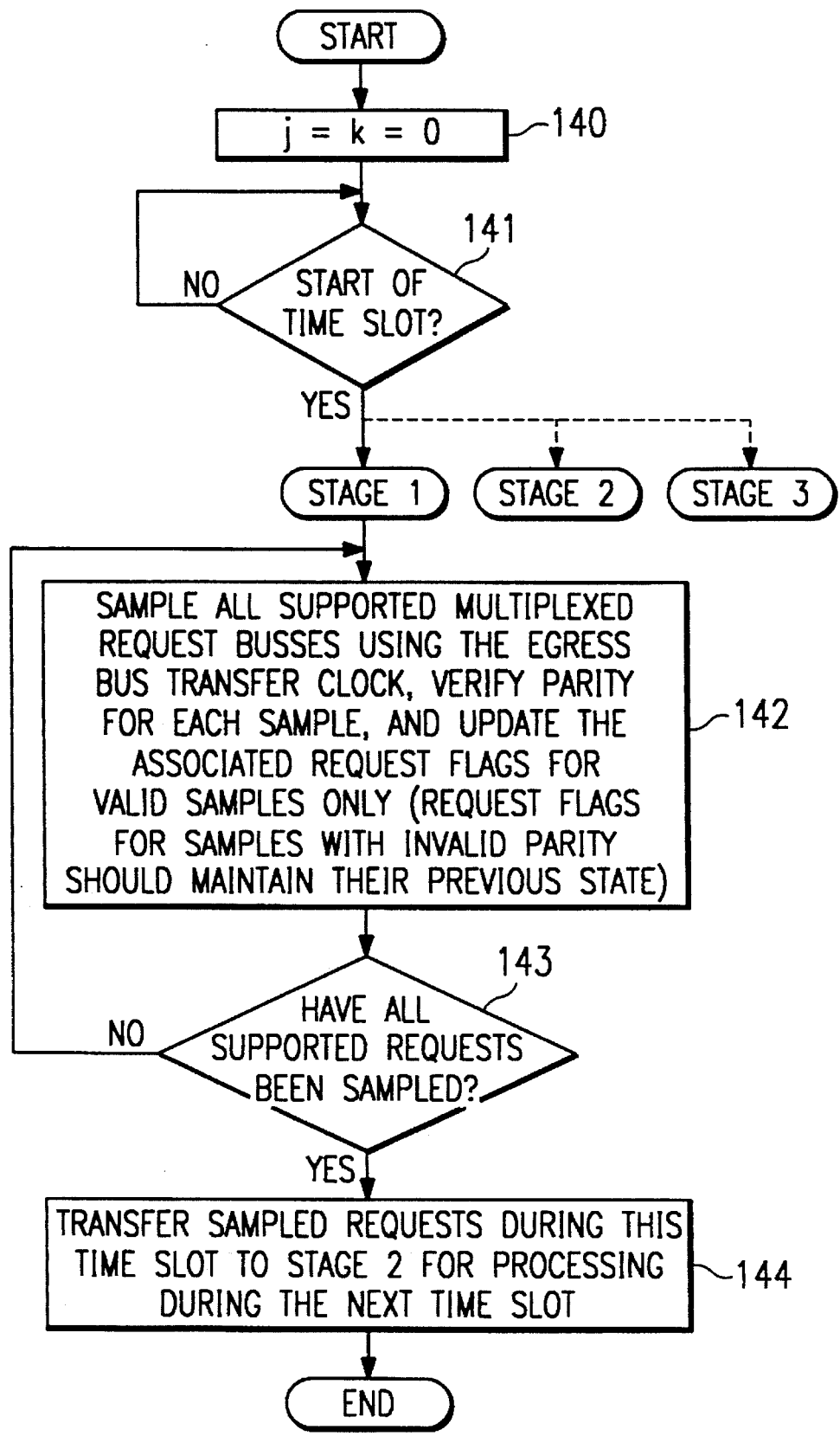
FIGS. 9a–e illustrate flow charts of an alternative method utilized by a slot arbiter in an arbitration tournament according to the teachings of the present invention.
Figure 9B:
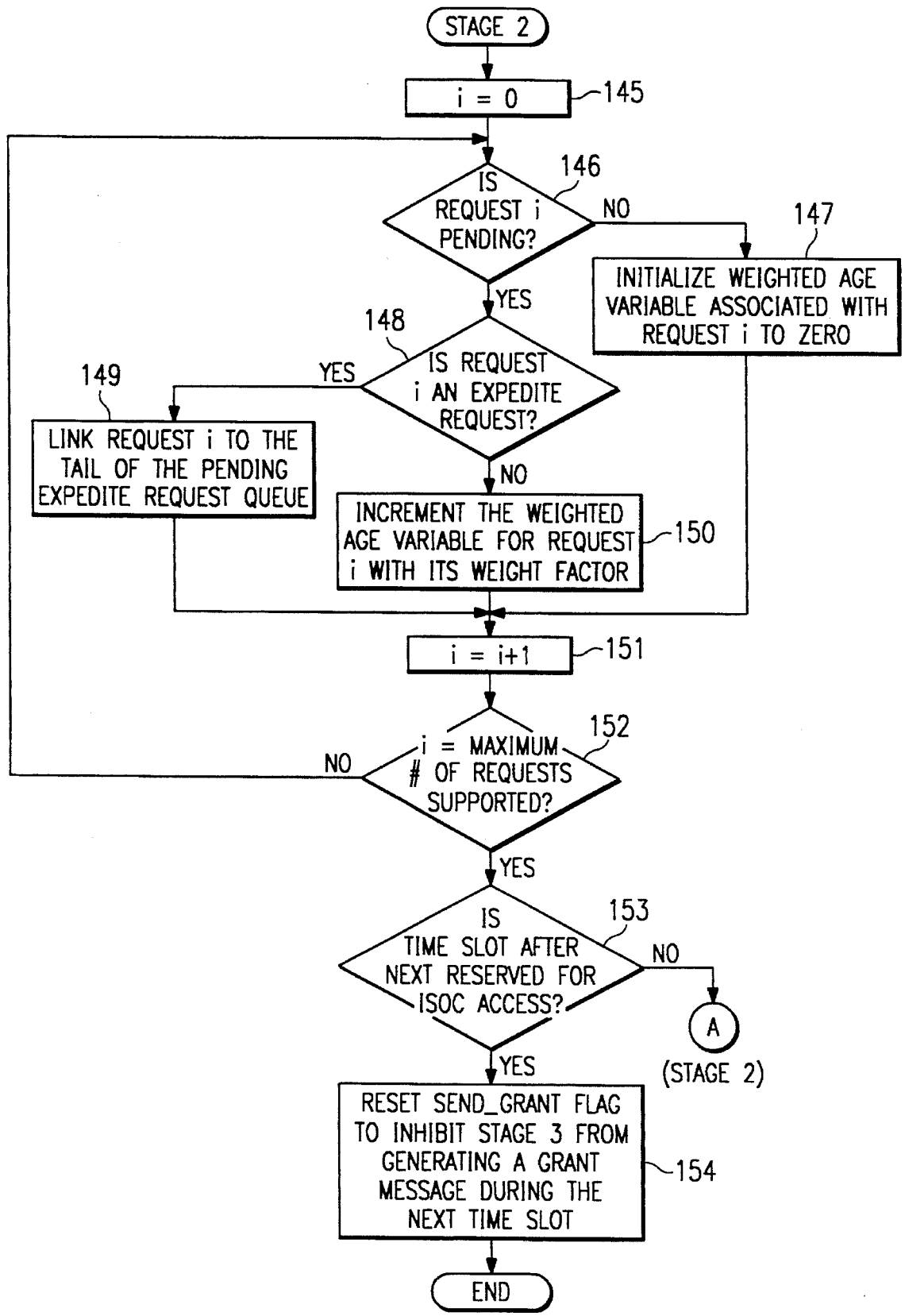
Figure 9C:
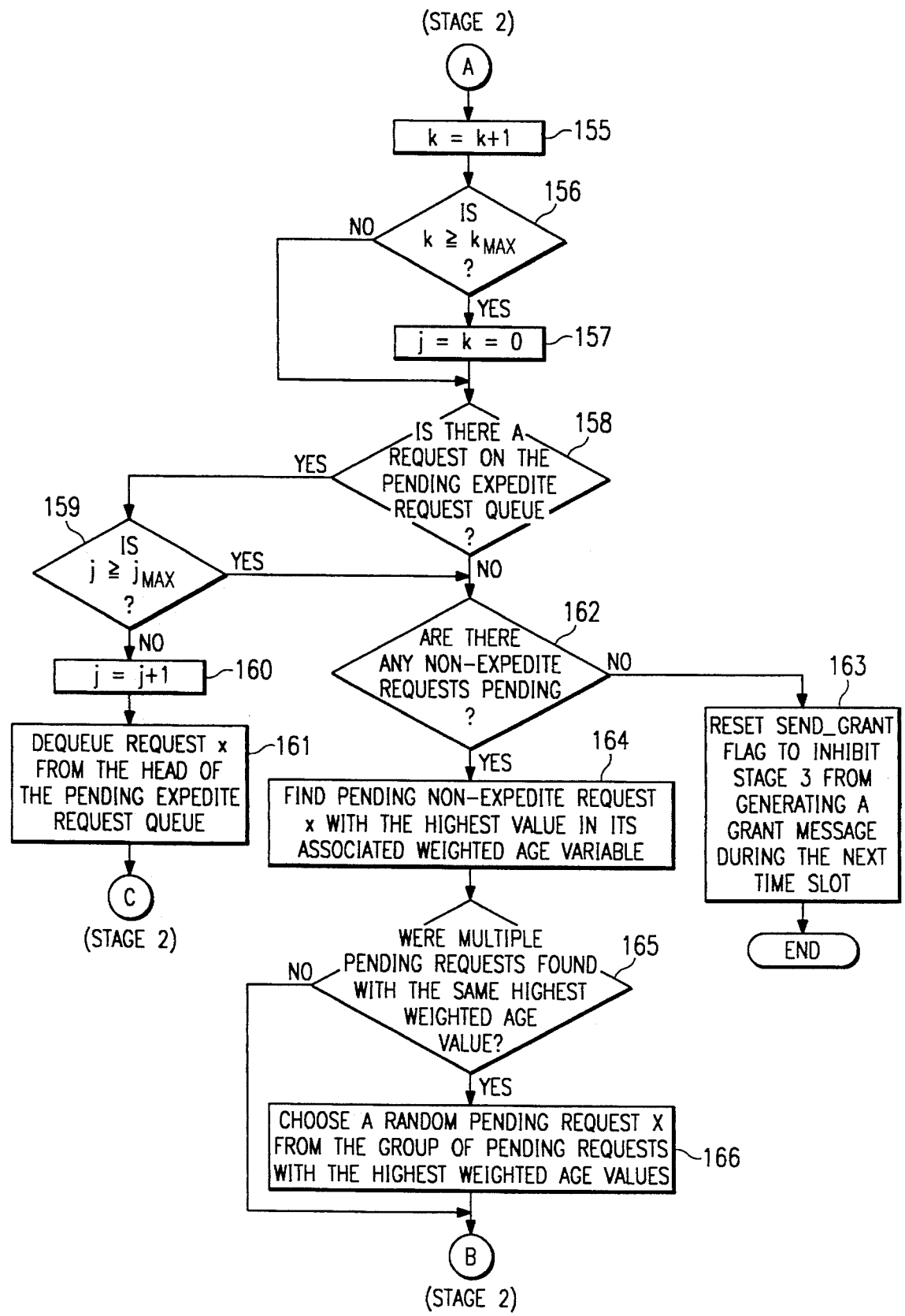
Figure 9D:
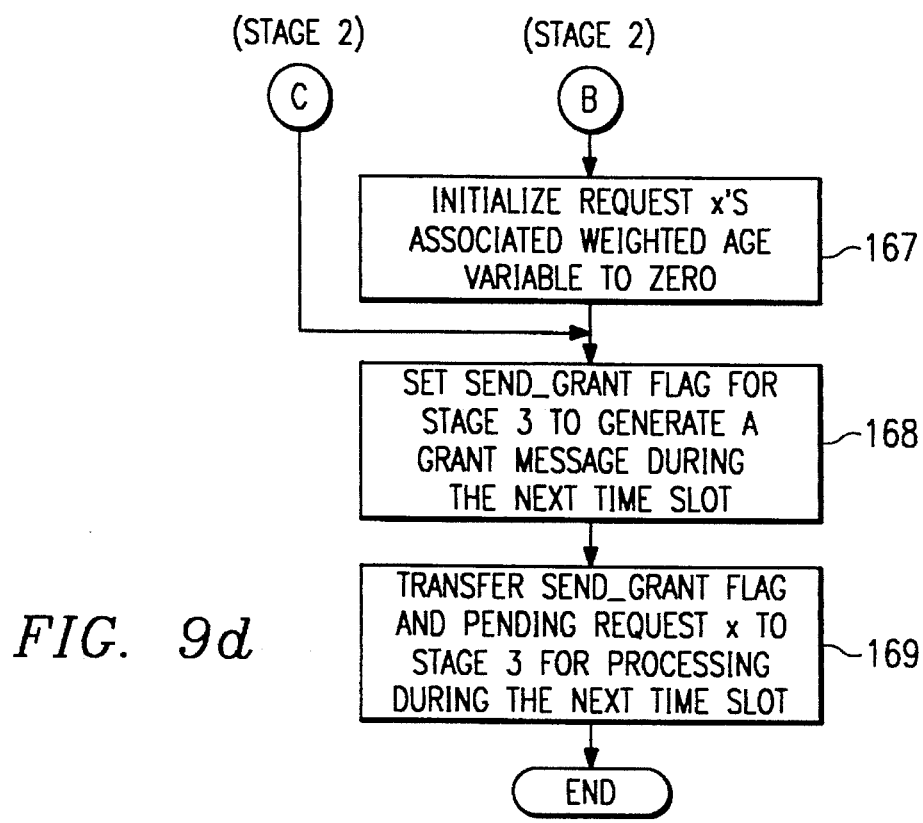
Figure 9E:
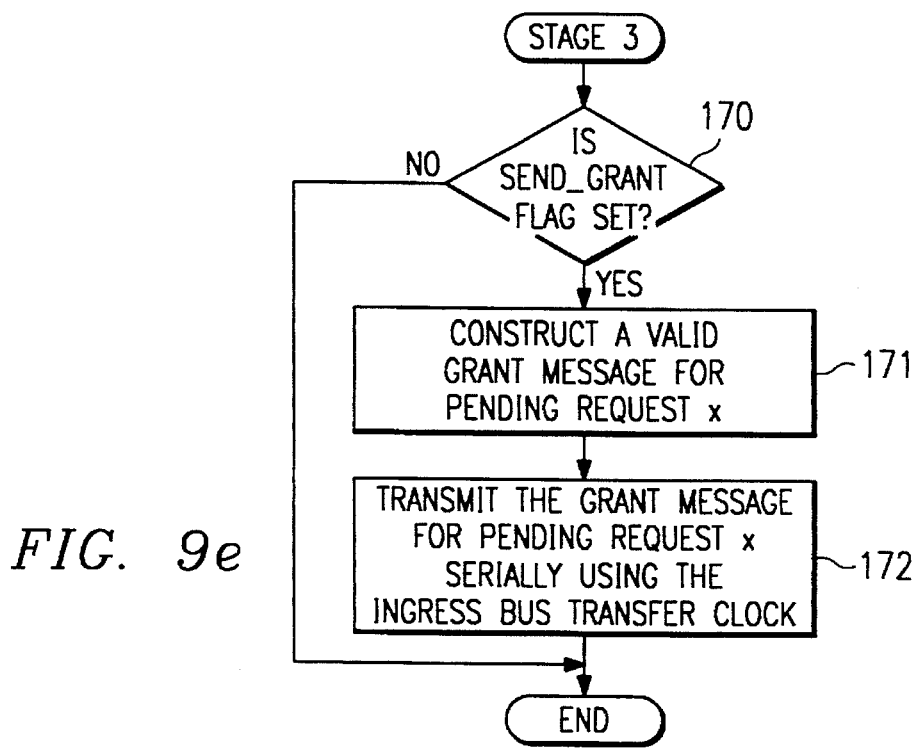

As shown in FIG. 7a–b, steps 70 through 83 are required to be executed as illustrated during every switching interval (i.e., repeatedly during each bus time slot) by an interface module connected to the slotted bus in order to issue requests and receive grants for an on demand ingress access to an idle asynchronous time slot according to the teachings of the present invention. Specifically, steps 70 through 74 define a procedure by which an interface module conforming to the present invention scans its normal class of service ingress subqueues for packets (i.e., packets requiring non-expedite priority level access) and setting a local request flag for each associated normal request priority level supported by the module that has a packet pending ingress bus access.

In step 75, the expedite subqueue is checked for any packets requiring expedite priority ingress bus access. If an expedite packet is found at the head of the expedite ingress queue and it is found in step 76 that an expedite request had not been previously issued for this specific expedite packet, then the local expedite request flag is set in step 77. Note that unlike normal requests (which are treated by the centralized bus arbiter as level sensitive requests), the expedite requests are treated by the centralized bus arbiter as edge sensitive requests and should only be issued by the interface modules once for each new packet when it appears at the head of the expedite subqueue.

During step 78, the interface module utilizes the status of the local request flags to generate valid parity and drive its associated requests on the multiplexed request bus during the egress bus transfer clock cycle designated to the corresponding interface module according to its physical slot position within the chassis. All of the local request flags are reset in step 79. The grant bus is continuously monitored for a grant message addressed to the corresponding module concurrently by the corresponding interface module while executing the process defined in steps 70 through 83.

A grant message associated with the corresponding interface module is identified both by the physical slot number and the assigned chassis number which houses the module. In step 80, if a grant message has been recognized for any of the pending requests of the corresponding interface module and the next time slot is found not to be reserved for isochronous access (step 81), then a packet is dequeued from the head of the appropriate subqueue associated with the request being granted in step 82. Next (step 83) this packet is staged to be transmitted into the ingress bus media beginning with the next time slot. The interface module then repeats the same process over again starting with step 70, while continuously monitoring the grant bus for a serial grant message associated with the corresponding interface module.

FIGS. 8a–e illustrate the detailed process steps required of a centralized asynchronous bus arbiter to implement the arbitration method according to the teachings of the present invention. This process involves three concurrent processes (identified as Stages 1 through 3) that are implemented to execute in a pipelined fashion. Each of these stages or processes are continuously executed during consecutive time slot intervals; and in this pipelined arrangement, the results of one cycle (Stage 1) are transferred to the next succeeding cycle in the pipeline (Stage 2), whose results are in turn transferred to the next succeeding and final cycle in the pipeline (Stage 3). Step 85 illustrates the initial synchronization of the concurrent stages to all commence simultaneously with the start of a bus time slot.

Stage 1 (steps 86 through 88) represents the steps required of the centralized asynchronous bus arbiter to service all supported multiplexed request buses, sampling all possible requests supported by the arbiter. Note that there exist a separate multiplexed request bus for each chassis supported by the arbiter, and that the request bus timing is synchronized with the egress bus timing common to all of the supported buses. In step 86, a plurality of different priority level requests from all interface modules installed in the same physical slot position within each supported chassis are sampled concurrently. A plurality of different priority level requests from interface modules installed in each successive physical slot position are sampled on consecutive cycles of the egress bus transfer clock within an egress time slot, with the first clock cycle associated with the first physical slot position within a chassis. Each sample taken from a multiplexed request bus is validated using parity check logic. If a sample is found to be valid, then the individual request flags associated with the sample are updated accordingly (i.e., each request flag is set/reset if the corresponding request priority bit in the sample is set/reset respectively). If a sample is found to be invalid (i.e., contains a parity error), then the entire sample is ignored and the individual request flags associated with the sampler maintain their previous state. In step 88, the collective sample of all possible supported requests are staged to be transferred to the following stage (Stage 2) for contention resolution. Note that there exists a phase shift between the egress and ingress timing as seen by the centralized arbiter and that the steps in FIGS. 8a–e are intended to illustrate the various logical steps comprising the arbitration mechanism. In particular, step 85 is intended to imply a logical synchronization amongst the three concurrent stages and should not be construed to imply phase alignment or any exact timing relationship.

In general, Stage 1 is synchronized to the egress timing due to the sampling requirements on the multiplexed request buses. Stages 2 and 3 on the other hand, are synchronized with the ingress timing to maintain a strict timing relationship with the grants being issued with respect to the corresponding ingress bus time slots. Execution of step 88 represents the conclusion of Stage 1 processing for the current cycle and the next Stage 1 cycle starts again with step 86 at the beginning of the next time slot as before.

Steps 89 through 118 (i.e., Stage 2) comprise the contention resolution tournament executed for every switching interval to dynamically assign an idle asynchronous time slot of bandwidth from the bus to a specific interface module to switch a packet from the ingress portion of a switch to the egress portion of a switch. Starting with step 90, each supported request sample (collected from Stage 1 during the previous time slot) is individually scanned. If a sample indicates that a particular request is not pending, then step 91 shows that the weighted age variable associated with the sample request is initialized to zero. If a sample indicates that a particular request is a pending expedite request, then in step 93 the corresponding expedite request is linked to the tail of the pending expedite request queue so that it will be serviced in a strict first-in/first-out fashion amongst other potentially pending expedite requests. If a pending request is found in step 92 not to be an expedite request, then the weighted age variable associated with this request is incremented in step 94 by its corresponding weight factor.

When it is determined in step 96 that all request samples have been scanned (i.e., all pending expedite requests have been linked to the pending expedite queue and all normal requests have had their associated weighted age variables updated appropriately), the process proceeds to select a pending request of which to grant access. In step 97, a determination is made with advanced isochronous reservation notification provided by the head-of-bus control as to whether the time slot following the next time slot (i.e., two time slots hence) is reserved for isochronous access. If it is found to be reserved, then in step 98 a flag is reset to indicate to the following stage (stage 3) that a grant should not be issued during the next time slot and in this case Stage 2 processing is concluded for the current cycle.

The pending expedite request queue is checked in step 99. If a pending expedite request is found, it is dequeued from the head of the queue in step 110 and is in turn staged to be transferred to Stage 3 to generate a grant message associated with this request during the next time slot in steps 117 and 118. If there are no pending expedite requests identified, then in step 111 a check is made to see if there are any normal (i.e., non-expedite) requests pending. If no normal requests are found pending then in step 112, a flag is reset to indicate to the following stage (Stage 3) that a grant should not be issued during the next time slot and in this case Stage 2 processing is concluded for the current cycle. If on the other hand, one or more non-expedited requests are found pending then in step 113, the arbiter sorts through all pending non-expedite requests and attempts to find a single request with the highest associated weighted age. Step 114 is a check to see if multiple requests were found with the same highest weighted age values and if so step 115 indicates that a request is chosen from this lot at random as a tie breaker. The weighted age variable associated with the selected request is initialized to zero in step 116. A flag is set in step 117 to indicate to Stage 3 that a grant should be issued during the next time slot.

In step 118, the selected request is staged to be transferred to Stage 3 to allow a grant message associated with this request to be generated during the next time slot. This concludes Stage 2 processing for this cycle. At the beginning of the next time slot, the contention resolution tournament begins again with step 89 with the remaining pending requests and any new arrivals detected by Stage 1. The pending requests enter the new tournament with a higher age value than the previous tournament because they are now older having waited one switching interval since the last tournament. Because the weighted aging takes place at a different pace depending upon the priority of the request (i.e., the corresponding weight factor), the ranking of a request during subsequent intervals may be different. For instance, a request may surpass another pending request if the first request is of higher priority than the second even though this second request may have arrived first.

Stage 3 (steps 119 through 121) represents the steps required of the centralized asynchronous bus arbiter to issue a serial grant message for ingress access to the following time slot by the selected request (i.e., the request winning the tournament during the previous time slot in Stage 2). The first step in this stage (step 119) is to determine if a grant message should be issued during this cycle at all. Note that a grant message will not be issued if there are no pending requests or if the following time slot has been reserved for isochronous access, and in this case further Stage 3 processing is bypassed for the current cycle. If a grant message is to be issued during this cycle, then in step 120 a valid grant message is constructed for the selected request with valid parity appended. In step 121, the grant message is serially transmitted into the grant bus media to be monitored by all interface modules in the system. At the conclusion of the current cycle, Stage 3 processing resumes again at step 119 at the beginning of the next time slot.

FIGS. 9a–e incorporate all of the detailed arbiter processes illustrated in FIGS. 8a–e and in addition show the enhancements added to provide a dynamic expedite request/grant throttling mechanism according to the teachings of the present invention. This process is identical to the process illustrated in FIGS. 8a–e in that it involves three concurrent processes (identified as Stages 1 through 3) that are implemented in the same manner to execute in a pipeline fashion. The enhancements added in FIGS. 9a–e not found in FIGS. 8a–e are primarily in the initialization phase and various additional steps added in Stage 2 processing. Together, these enhancements provide an added mechanism to provide dynamic throttling of the number of expedite requests being granted over time not to exceed a predefined threshold ($j_{max}$) over a given number of asynchronous switching intervals ($k_{max}$). The initialization phase 140 consists of resetting two counters used by the throttling mechanism to maintain a running count of the number of expedite requests granted (j) over a measurement interval defined in number of asynchronous switching intervals (k). The second initialization step 141 is identical to the sole initialization step in FIG. 8a and provides the initial synchronization of the concurrent stages to all commence simultaneously with the start of a bus time slot. Stage 1 processing is illustrated in steps 142 through 144, Stage 2 processing in steps 145 through 169, and Stage 3 processing in steps 170 through 172.

The enhancements made to Stage 2 processing to provide the dynamic expedite request/grant throttling consist of only added steps 155 through 157 and steps 159 through 160. Step 155 increments the expedite throttling measurement interval counter k once it has been determined in step 153 that the time slot after next is not reserved for isochronous access (i.e., represents an asynchronous switching interval). This measurement interval counter is compared to its predefined maximum value $k_{max}$ in step 156 to determine if the current measurement interval is complete. If this counter is found to have reached or exceeded its maximum value, then this counter and the expedite grant occurrence counter j are both initialized to zero in step 157 and a new expedite throttling measurement interval commences. If the expedite request arbitration mechanism was disabled due to the limit of expedite requests granted having been reached previously, the initialization of the expedite grant occurrence counter in turn rearms the expedite request arbitration mechanism immediately allowing any pending expedite requests to be granted access to the next available asynchronous time slot. Step 159 represents the test of the expedite grant occurrence counter to see if the number of expedite requests granted in the current expedite throttling measurement interval has reached or exceeded its threshold. If the threshold has been reached, then the expedite arbitration process is bypassed and control is transferred to step 162 to service any pending non-expedite requests. If on the other hand the expedite throttling threshold has not been reached or exceeded, then the expedite arbitration process is performed resulting in an expedite request being granted and in step 160 the expedite grant occurrence counter is incremented.

Summary of Arbitration and Overview

The bus arbitration method for telecommunications switching of the present invention provides a number of technical advantages. A first technical advantage is dynamic control of the arbitration to deterministically guarantee a certain percentage of the bus to specific users at times when bandwidth demands exceed the supply. This allows one requestor or class of requestors to get the full bandwidth of the bus or to get a limited portion of the bus bandwidth in times of congestion.

Another technical advantage of the present invention is short arbitration cycles allowing the minimization of empty asynchronous time slots on a system bus going unused when requests for that time slot are pending.

Another technical advantage of the present invention is the ability to change dynamically the weighting of different classes of service to allow the system to be tuned to adapt to changing network switch characteristics potentially due to changes in traffic loads and burst characteristics of the traffic itself.

A further technical advantage of the present invention is a dynamically controllable system that allows a certain percentage of available bus time slots to be deterministically guaranteed to a certain class of users during times of bus congestion. The system can be modified to allow a requestor or class of requestors the full bandwidth of the bus or to limit a requestor to a proportion of the bandwidth of the bus at times when requests for asynchronous bus bandwidth exceeds the amount of asynchronous bandwidth available.

Although the present invention has been described in detail, it should be understood that various changes, substitutions and alterations can be made hereto without departing from the spirit and scope of the present invention as defined by the appended claims.

What is claimed is:

1. A bus arbitration method for telecommunications switching, comprising the steps of;

receiving a plurality of requests for placing packets corresponding to the requests on an available idle asynchronous bus time slot, wherein each request has an associated weighted age indicating an amount of time the request has been pending and a priority of the request;

ordering the plurality of requests according to the weighted age of each request; and granting access to the available asynchronous bus time slot to a request having a highest weighted age.

2. The bus arbitration method of claim 1, wherein the step of ordering comprises providing the weighted age of each request to a shuffle exchange network to determine a highest weighted age.

3. The bus arbitration method of claim 1, wherein each weighted age is equal to a period of time accumulated by each request waiting for a grant of access to an available bus time slot increased according to a weighting factor associated with each request.

4. The bus arbitration method of claim 3, further comprising the step of dynamically changing the weighting factor associated with each request.

5. The bus arbitration method of claim 3, further comprising the step of dynamically controlling the weighting factor associated with each request to deterministically guarantee a percentage of available bus time slots to a class of requests.

6. The bus arbitration method of claim 1, wherein the steps of receiving, ordering and granting are performed by an asynchronous slot arbiter connected to a system bus of a switch for a telecommunications network.

7. The bus arbitration method of claim 6, wherein each weighted age is equal to a period of time accumulated by each request waiting for a grant of access to an available bus time slot on the system bus increased according to a weighting factor associated with each request.

8. The bus arbitration method of claim 7, further comprising the step of tuning arbitration to match the telecommunications network by dynamically changing the weighting factor associated with each request.

9. The bus arbitration method of claim 7, further comprising the step of dynamically controlling the weighting factor associated with each request to deterministically guarantee a percentage of available bus time slots on the system bus to a class of requests originating from an entity in the telecommunications network.

10. A bus arbitration method for telecommunications switching, comprising the steps of;

generating a plurality of requests for each of a plurality of packets needing an available bus time slot;

measuring an amount of time during which each request is pending;

determining a weighted age for each request in response to the amount of time pending and a priority assigned to each request;

granting access for the available bus time slot for one of the plurality of packets corresponding to a request having a highest weighted age; and placing the packet for which access is granted in the available bus time slot.

11. The bus arbitration method of claim 10, wherein said generating and measuring steps are performed by a plurality of interface modules connected to a system bus in a telecommunications network, wherein said determining, granting, and placing steps are performed by an asynchronous slot arbiter, and wherein the asynchronous slot arbiter is centralized to process requests from each of the plurality of interface modules.

12. The bus arbitration method of claim 10, further comprising the steps of:

generating a weighted age for each packet corresponding to the requests; and attaching each weighted age of each packet to its corresponding request.

13. The bus arbitration method of claim 12, granting access for the packet and corresponding request in response to the weighted age of the packet and the weighted age of the request.

14. A bus arbitration method for telecommunications switching, comprising the steps of;

tagging each of a plurality of requests for an available bus time slot with a time stamp;

associating a weighted age with each request by measuring an amount of time during which each request is pending after the time stamp and increasing the amount of time according to a weighting factor;

ranking the plurality of requests according to the weighted age of each request;

acknowledging a winning request having a highest weighted age;

issuing a grant to the winning request for access to the available bus time slot;

removing the winning request from the plurality of requests;

checking whether requests remain in the plurality of requests;

repeating the above steps until no requests remain for an available bus time slot.

15. The bus arbitration method of claim 14, wherein the step of ranking further comprises ranking all tied requests in a random order.

16. The bus arbitration method of claim 14, wherein the step of ranking comprises providing the weighted age of each request to a shuffle exchange network to determine a highest weighted age.

17. The bus arbitration method of claim 14, further comprising the step of dynamically changing the weighting factor associated with each request.

18. The bus arbitration method of claim 14, further comprising the step of dynamically controlling the weighting factor associated with each request to deterministically guarantee a percentage of available bus time slots to a class of requests.

19. The bus arbitration method of claim 14, wherein the steps are performed by an asynchronous slot arbiter connected to a system bus of a switch for a telecommunications network.

20. The bus arbitration method of claim 19, further comprising the step of tuning arbitration to match the telecommunications network by dynamically changing the weighting factor associated with each request.

21. The bus arbitration method of claim 19, further comprising the step of dynamically controlling the weighting factor associated with each request to deterministically guarantee a percentage of available bus time slots on the system bus to a class of requests originating from an entity in the telecommunications network.

\* \* \* \* \*